(12) United States Patent
Murakami et al.

(10) Patent No.: US 12,497,357 B2
(45) Date of Patent: Dec. 16, 2025

(54) METHOD OF PRODUCING POLYAMINE COMPOUND AND APPLICATION THEREOF

(71) Applicant: MITSUI CHEMICALS, INC., Tokyo (JP)

(72) Inventors: Masakazu Murakami, Omuta (JP); Shotaro Nakano, Omuta (JP); Shinnosuke Nakai, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 522 days.

(21) Appl. No.: 17/758,909

(22) PCT Filed: Feb. 5, 2021

(86) PCT No.: PCT/JP2021/004361
§ 371 (c)(1),
(2) Date: Nov. 15, 2022

(87) PCT Pub. No.: WO2021/157702
PCT Pub. Date: Aug. 12, 2021

(65) Prior Publication Data
US 2023/0286897 A1    Sep. 14, 2023

(30) Foreign Application Priority Data

| Feb. 5, 2020 | (JP) | 2020-017717 |
| Feb. 5, 2020 | (JP) | 2020-017718 |
| May 18, 2020 | (JP) | 2020-086644 |
| May 18, 2020 | (JP) | 2020-086645 |
| Nov. 19, 2020 | (JP) | 2020-192461 |

(51) Int. Cl.
| C07C 319/22 | (2006.01) |
| C07C 209/62 | (2006.01) |
| C07C 211/27 | (2006.01) |
| C07C 263/10 | (2006.01) |
| C07C 265/08 | (2006.01) |
| C07C 273/02 | (2006.01) |
| C07C 319/02 | (2006.01) |
| C07C 319/20 | (2006.01) |
| C07C 321/14 | (2006.01) |
| C07C 323/64 | (2006.01) |
| C08G 18/28 | (2006.01) |
| C08G 18/32 | (2006.01) |
| C08G 18/38 | (2006.01) |
| C08G 18/76 | (2006.01) |
| C08G 18/83 | (2006.01) |
| C09D 175/04 | (2006.01) |
| G02B 1/00 | (2006.01) |
| G02B 1/04 | (2006.01) |
| G02B 3/00 | (2006.01) |
| G02C 7/02 | (2006.01) |
| C07C 217/02 | (2006.01) |

(52) U.S. Cl.
CPC .......... C07C 319/22 (2013.01); C07C 209/62 (2013.01); C07C 211/27 (2013.01); C07C 263/10 (2013.01); C07C 265/08 (2013.01); C07C 273/02 (2013.01); C07C 319/02 (2013.01); C07C 319/20 (2013.01); C07C 321/14 (2013.01); C07C 323/64 (2013.01); C08G 18/2865 (2013.01); C08G 18/3228 (2013.01); C08G 18/3271 (2013.01); C08G 18/3855 (2013.01); C08G 18/3876 (2013.01); C08G 18/7642 (2013.01); C08G 18/833 (2013.01); C09D 175/04 (2013.01); G02B 1/041 (2013.01); G02B 3/00 (2013.01); G02C 7/02 (2013.01); *C07C 217/02* (2013.01); *G02B 1/00* (2013.01); *Y02W 30/62* (2015.05)

(58) Field of Classification Search
CPC ... C07C 319/22; C07C 209/62; C07C 263/10; C07C 273/02; C07C 211/27; C07C 265/08; C07C 319/02; C07C 319/20; C07C 321/14; C07C 323/64; C07C 217/02; C08G 18/3876; C08G 18/7642; C08G 18/2865; C08G 18/3228; C08G 18/3271; C08G 18/3855; C08G 18/833; G02B 1/041; G02B 1/00; G02B 3/00; Y02W 30/62; C09D 175/04; G02C 7/02
See application file for complete search history.

(56) References Cited

U.S. PATENT DOCUMENTS

| 4,775,733 | A | 10/1988 | Kanemura et al. |
| 5,087,758 | A | 2/1992 | Kanemura et al. |
| 5,608,115 | A | 3/1997 | Okazaki et al. |
| 2009/0259001 | A1 | 10/2009 | Kousaka |
| 2014/0039145 | A1 | 2/2014 | Jang et al. |
| 2023/0088165 | A1* | 3/2023 | Murakami ............ C07C 321/14 528/77 |

FOREIGN PATENT DOCUMENTS

| JP | S6346213 A | 2/1988 |
| JP | H02270859 A | 11/1990 |
| JP | H07252207 A | 10/1995 |
| JP | 2002-173471 A | 6/2002 |
| JP | 2010-215519 A | 9/2010 |
| JP | 2011-132175 A | 7/2011 |
| JP | 6258446 B2 | 1/2018 |
| WO | 2008/026727 A1 | 3/2008 |

* cited by examiner

*Primary Examiner* — Rabon A Sergent
(74) *Attorney, Agent, or Firm* — BUCHANAN INGERSOLL & ROONEY PC

(57) ABSTRACT

A method of producing a polyamine compound, the method including: a first step of generating a polyurea compound by reacting a thiourethane resin and an amine compound A with each other; and a second step of generating a polyamine compound by reacting the polyurea compound and an amine compound B with each other.

15 Claims, No Drawings

METHOD OF PRODUCING POLYAMINE COMPOUND AND APPLICATION THEREOF

TECHNICAL FIELD

The present disclosure relates to a method of producing a polyamine compound, and an application thereof.

BACKGROUND ART

Plastic lenses, which are resin-containing lenses, are lightweight, hardly breakable, and dyeable as compared to inorganic lenses; therefore, in recent years, the use of plastic lenses as eyeglass lenses, camera lenses, and the like has been rapidly increased.

For example, various studies have been conducted on thiourethane resin-containing lenses (see, for example, Patent Documents 1 to 3).

Patent Document 1: Japanese Patent Application Laid-Open (JP-A) No. S63-46213
Patent Document 2: JP-A No. H2-270859
Patent Document 3: JP-A No. H7-252207

SUMMARY OF THE INVENTION

Technical Problem

A thiourethane resin is usually produced using a polythiol composition and a polyisocyanate compound as raw materials. A lens containing a thiourethane resin is produced by cutting and processing a formed body containing the thiourethane resin. In this process, a large amount of cut powder containing the thiourethane resin may be generated. Conventionally, such cut powder generated in a large amount is simply disposed of, without being effectively utilized.

In addition, in the step of producing the formed body containing the thiourethane resin, a defective formed article or a defective processed article is generated. Conventionally, such defective formed article or defective processed article is simply disposed of, without being effectively utilized.

However, from the standpoint of effective utilization (i.e., recycle) of materials, a technology for producing a polyamine compound, which is a raw material of a polyisocyanate compound, using a thiourethane resin contained in a cut powder as a starting material is desired. The resulting polyamine compound can be used as a raw material of a new polyisocyanate compound, and this new polyisocyanate compound can be used as a raw material of a new thiourethane resin.

Further, a technology for producing a polyamine compound using a thiourethane resin as a starting material, which is not limited to the use of a thiourethane resin contained in a cut powder as a starting material, is desired.

An object of first and second embodiments of the disclosure is to provide a method of producing a polyamine compound, by which a polyamine compound can be produced using a thiourethane resin as a starting material, and an application thereof.

Solution to Problem

Means for solving the above-described problems encompass the following aspects.

The method of producing a polyamine compound according to the first embodiment of the disclosure is the method of producing a polythiol composition according to the below-described <1>.

The method of producing a polyamine compound according to the second embodiment of the disclosure is the method of producing a polythiol composition according to the below-described <12>

There may be an overlapping part between the embodiments.

<1> A method of producing a polyamine compound, the method comprising:
  a first step of generating a polyurea compound by reacting a thiourethane resin and an amine compound A with each other; and
  a second step of generating a polyamine compound by reacting the polyurea compound and an amine compound B with each other.

<2> The method of producing a polyamine compound according to <1>, wherein, in the first step, a powder comprising the thiourethane resin, and the amine compound A, are brought into contact with each other to allow the thiourethane resin in the powder and the amine compound A to react with each other.

<3> The method of producing a polyamine compound according to <2>, wherein:
  the method further comprises, prior to the first step, a sieving step of applying a cut powder comprising the thiourethane resin to a sieve to obtain the powder comprising the thiourethane resin, which has passed through the sieve, and
  in the first step, the powder obtained in the serving step and the amine compound A are brought into contact with each other to allow the thiourethane resin in the powder and the amine compound A to react with each other.

<4> The method of producing a polyamine compound according to <3>, wherein the sieve has a nominal mesh size of from 0.1 mm to 20 mm as defined by JIS Z-8801-1:2019.

<5> The method of producing a polyamine compound according to any one of <1> to <4>, wherein:
  the method further comprises, prior to the first step, a washing step of washing a powder comprising the thiourethane resin using a hydrocarbon compound having from 5 to 12 carbon atoms as a washing solvent, and
  in the first step, the powder washed in the washing step and the amine compound A are brought into contact with each other to allow the thiourethane resin in the powder and the amine compound A to react with each other.

<6> The method of producing a polyamine compound according to any one of <1> to <5>, wherein, in the first step, the thiourethane resin and the amine compound A are reacted with each other under a temperature condition of from 70° C. to 140° C.

<7> The method of producing a polyamine compound according to any one of <1> to <6>, wherein, in the second step, the polyurea compound and the amine compound B are reacted with each other under a temperature condition of from 100° C. to 180° C.

<8> The method of producing a polyamine compound according to any one of <1> to <7>, wherein the second step comprises:
  reacting the polyurea compound and the amine compound B with each other to generate a polyamine compound and a reaction by-product; and
  reacting the reaction by-product and an inorganic base with each other to generate the amine compound B.

<9> The method of producing a polyamine compound according to any one of <1> to <8: wherein:

the amine compound A is an amine compound of 300 or less in molecular weight, which comprises at least one of an amino group or a monoalkylamino group, and has a total number of amino groups and monoalkylamino groups of 1 or 2, and the amine compound B is an amine compound of 2,000 or less in molecular weight, which comprises at least one of an amino group or a monoalkylamino group, and has a total number of amino groups and monoalkylamino groups of from 1 to 50.

<10> The method of producing a polyamine compound according to any one of <1> to <9>, wherein:
the second step comprises:
a reaction step of reacting the polyurea compound and the amine compound B with each other to obtain a reaction mixture comprising a polyamine compound; and
a separation step of separating the polyamine compound from the reaction mixture, and
the separation step comprises separating the polyamine compound from the reaction mixture by a distillation method.

<11> The method of producing a polyamine compound according to any one of <1> to <10>, wherein:
the second step comprises:
a reaction step of reacting the polyurea compound and the amine compound B with each other to obtain a reaction mixture comprising a polyamine compound; and
a separation step of separating the polyamine compound from the reaction mixture, and
the separation step comprises:
extracting the polyamine compound from the reaction mixture using an extraction solvent to obtain an extract comprising the polyamine compound; and
separating the polyamine compound from the extract.

<12> A method of producing a polyamine compound, the method comprising:
a step X1 of generating a polycarbamate compound by reacting a thiourethane resin and an alcohol compound with each other in the presence of an amine compound XA that is a tertiary amine compound; and
a step X2 of generating a polyamine compound by reacting the polycarbamate compound and an amine compound XB with each other.

<13> The method of producing a polyamine compound according to <12>, wherein, in the step X1, a powder comprising the thiourethane resin, and the alcohol compound, are brought into contact with each other to allow the thiourethane resin in the powder and the alcohol compound to react with each other.

<14> The method of producing a polyamine compound according to <13>, wherein:
the method further comprises, prior to the step X1, a classification step of classifying a cut powder comprising the thiourethane resin to obtain the powder comprising the thiourethane resin, the powder having a smaller average particle size than the cut powder, and
in the step X1, the powder obtained in the classification step and the alcohol compound are brought into contact with each other to allow the thiourethane resin in the powder and the alcohol compound to react with each other.

<15> The method of producing a polyamine compound according to <13>, wherein:
the method further comprises, prior to the step X1, a sieving step of applying a cut powder comprising the thiourethane resin to a sieve to obtain the powder comprising the thiourethane resin, which has passed through the sieve, and
in the step X1, the powder obtained in the serving step and the alcohol compound are brought into contact with each other to allow the thiourethane resin in the powder and the alcohol compound to react with each other.

<16> The method of producing a polyamine compound according to <15>, wherein the sieve has a nominal mesh size of from 0.1 mm to 20 mm as defined by JIS Z-8801-1:2019.

<17> The method of producing a polyamine compound according to any one of <12> to <16>, wherein:
the method further comprises, prior to the step X1, a washing step of washing a powder comprising the thiourethane resin using a hydrocarbon compound having from 5 to 12 carbon atoms as a washing solvent, and
in the step X1, the powder washed in the washing step and the alcohol compound are brought into contact with each other to allow the thiourethane resin in the powder and the alcohol compound to react with each other.

<18> The method of producing a polyamine compound according to any one of <12> to <17>, wherein the alcohol compound comprises a compound having a boiling point of from 135° C. to 250° C.

<19> The method of producing a polyamine compound according to any one of <12> to <18>, wherein, in the step X1, the thiourethane resin and the alcohol compound are reacted with each other under a temperature condition of from 70° C. to 200° C.

<20> The method of producing a polyamine compound according to any one of <12> to <19>, wherein, in the step X2, the polycarbamate compound and the amine compound XB are reacted with each other under a temperature condition of from 100° C. to 180° C.

<21> The method of producing a polyamine compound according to any one of <12> to <20>, wherein the step X2 comprises:
reacting the polycarbamate compound and the amine compound XB with each other to generate a polyamine compound and a reaction by-product; and
reacting the reaction by-product and an inorganic base with each other to generate the amine compound XB.

<22> The method of producing a polyamine compound according to any one of <12> to <21>, wherein:
the step X2 comprises:
a reaction step of reacting the polycarbamate compound and the amine compound XB with each other to obtain a reaction mixture comprising a polyamine compound; and
a separation step of separating the polyamine compound from the reaction mixture, and
the separation step comprises separating the polyamine compound from the reaction mixture by a distillation method.

<23> The method of producing a polyamine compound according to any one of <12> to <20>, wherein:
the step X2 comprises:
a reaction step of reacting the polycarbamate compound and the amine compound XB with each other to obtain a reaction mixture comprising the polyamine compound; and
a separation step of separating the polyamine compound from the reaction mixture, and the separation step comprises:
extracting the polyamine compound from the reaction mixture using an extraction solvent to obtain an extract comprising the polyamine compound; and separating the polyamine compound from the extract.

<24> The method of producing a polyamine compound according to any one of <1> to <23>, wherein the polyamine compound comprises at least one selected from the group consisting of pentamethylenediamine, hexamethylenediamine, m-xylylenediamine, p-xylylenediamine, isophoronediamine, bis(aminomethyl)cyclohexane, bis(aminocyclohexyl) methane, 2,5-bis(aminomethyl) bicyclo-[2.2.1]-heptane, 2,6-bis(aminomethyl) bicyclo-[2.2.1]-heptane, tolylenediamine, 4,4'-diphenylmethanediamine, and phenylenediamine.

<25> The method of producing a poly amine compound according to any one of <1> to <24>, which is a method of producing a polyamine compound as a raw material of a polyisocyanate compound for production of an optical material.

<26> The method of producing a polyamine compound according to any one of <1> to <25>, wherein the thiourethane resin is collected in at least one of an eyeglass lens production process, an eyeglass production process, or an eyeglass disposal process.

<27> A method of producing a polyisocyanate compound, the method comprising:
a step of producing a polyamine compound by the method of producing a polyamine compound according to any one of 1 to 26; and
a step of obtaining a polyisocyanate compound by reacting at least one of the polyamine compound or a hydrochloride of the polyamine compound and carbonyl dichloride with each other.

<28> A method of producing a polymerizable composition, the method comprising:
a step of producing a polyisocyanate compound by the method of producing a polyisocyanate compound according to <27>; and
a step of obtaining a polymerizable composition comprising the polyisocyanate compound and an active hydrogen compound by mixing at least the polyisocyanate compound and the active hydrogen compound.

<29> A method of producing a resin, the method comprising:
a step of producing a polymerizable composition by the method of producing a polymerizable composition according to <28>; and
a step of obtaining a resin by curing the polymerizable composition.

<30> A method of producing a resin-containing formed body, the method comprising:
a step of producing a polymerizable composition by the method of producing a polymerizable composition according to <28>; and
a step of obtaining a resin-containing formed body by curing the polymerizable composition.

<31> A method of producing an optical material comprising a resin-containing formed body, the method comprising:
a step of producing a polymerizable composition by the method of producing a polymerizable composition according to <28>; and
a step of obtaining a resin-containing formed body by curing the polymerizable composition.

<32> A method of producing a lens comprising a resin-containing formed body, the method comprising:

a step of producing a polymerizable composition by the method of producing a polymerizable composition according to <28>; and
a step of obtaining a resin-containing formed body by curing the polymerizable composition.

Advantageous Effects of Invention

According to the first and the second embodiments of the disclosure, a method of producing a polyamine compound, by which a polyamine compound can be produced using a thiourethane resin as a starting material, and an application thereof are provided.

DESCRIPTION OF EMBODIMENTS

In the disclosure, those numerical ranges that are expressed with "to" each denote a range that includes the numerical values stated before and after "to" as the lower limit value and the upper limit value, respectively.

In the disclosure, the term "step" encompasses not only a discrete step but also a step that cannot be clearly distinguished from other steps, as long as the intended purpose of the step is achieved.

In the disclosure, when there are plural substances that correspond to a component of a composition, the indicated amount of the component in the composition means, unless otherwise specified, a total amount of the plural substances existing in the composition.

In a set of numerical ranges that are stated in a stepwise manner in the disclosure, the upper limit value or the lower limit value of one numerical range may be replaced with the upper limit value or the lower limit value of other numerical range. Further, in a numerical range stated in the disclosure, the upper limit value or the lower limit value of the numerical range may be replaced with a relevant value indicated in any of Examples.

The first embodiment and the second embodiment of the disclosure will now be described.

Hereinafter, with regard to a preferred characteristic feature in one embodiment, reference can be made as appropriate to a preferred characteristic feature of the other embodiment.

First Embodiment

[Method of Producing Polyamine Compound]

The method of producing a polyamine compound according to the first embodiment of the disclosure includes:
a first step of generating a polyurea compound by reacting a thiourethane resin and an amine compound A with each other, and
a second step of generating a polyamine compound by reacting the polyurea compound and an amine compound B with each other.

According to the method of producing a polyamine compound according to the first embodiment, a polyamine compound can be produced as a target material using a thiourethane resin as a starting material.

Particularly, in the first step, aminolysis (hereinafter, also referred to as "first aminolysis"), which is a reaction in which the thiourethane resin is decomposed by the amine compound A, occurs, and a polyurea compound is generated as a result of this first aminolysis. In the second step, aminolysis (hereinafter, also referred to as "second aminolysis"), which is a reaction in which the polyurea compound is decomposed by the amine compound B, occurs, and a polyamine compound that is a target material is generated as a result of this second aminolysis.

In the disclosure, as each of the amine compounds A and B, any known amine compound can be used, and the amine compounds A and B are not particularly limited.

In the disclosure, an amine compound used in the first step is referred to as "amine compound A" and distinguished from an amine compound that is used in the second step and referred to as "amine compound B". The amine compound A and the amine compound B may be amine compounds of the same kind, or may be amine compounds of different kinds.

The steps that may be included in the method of producing a polyamine compound according to the first embodiment will now be described.

<First Step>

The first step is the step of generating a polyurea compound by reacting a thiourethane resin and an amine compound A with each other.

(Thiourethane Resin)

As the thiourethane resin in the first step, any known thiourethane resin, examples of which include those thiourethane resins that are described in known documents, such as JP-A No. S63-46213, JP-A No. H2-270859, JP-A No. H7-252207, JP-A No. S60-199016, and WO 2008/047626, can be used.

The thiourethane resin used in the first step is preferably one collected in at least one of an eyeglass lens production process, an eyeglass production process, or an eyeglass disposal process. According to this aspect, recycle of the thiourethane resin that is an eyeglass lens material is realized.

It is noted here that:
the "eyeglass lens production process" means a process of producing a resin by mixing and cast-polymerizing monomers that are raw materials of the resin, and/or a process of obtaining an eyeglass lens by cutting a resin formed body;
the "eyeglass production process" means a process of producing an eyeglass by combining eyeglass lenses with other members such as an eyeglass frame; and
the "eyeglass disposal process" means a process of disposing of, for example, an eyeglass that has been produced but is no longer needed, or a used eyeglass.

In all of these processes, a thiourethane resin, which is an eyeglass lens material, may be generated as a waste.

In the present aspect, a thiourethane resin generated in at least one of these processes is used as a starting material, and this thiourethane resin and an amine compound A are reacted with each other to obtain a polyurea compound that is a decomposition product of the thiourethane resin.

The above-described starting material preferably contains a cut powder containing a thiourethane resin.

In the first step according to this aspect, the cut powder containing a thiourethane resin and an amine compound A are brought into contact with each other to allow the thiourethane resin and the amine compound A to react with each other.

In this aspect, because of superior reactivity between the amine compound A and the thiourethane resin contained in the starting material, a polyurea compound can be generated more effectively.

The thiourethane resin usually contains a polymer of an isocyanate compound and a polythiol composition. In other words, the thiourethane resin is usually produced using an isocyanate compound and a polythiol composition as raw materials.

—Isocyanate Compound as Raw Material of Thiourethane Resin—

The isocyanate compound as a raw material of the thiourethane resin may be used singly, or in combination of two or more kinds thereof.

Examples of the isocyanate compound as a raw material of the thiourethane resin include those known isocyanate compounds that are described in the aforementioned known documents.

The isocyanate compound as a raw material of the thiourethane resin preferably contains a polyisocyanate compound containing two or more isocyanato groups.

The isocyanate compound as a raw material of the thiourethane resin more preferably contains a diisocyanate compound containing two isocyanato groups, still more preferably contains at least one (hereinafter, also referred to as "isocyanate component A") selected from the group consisting of pentamethylene diisocyanate, hexamethylene diisocyanate, m-xylylene diisocyanate, p-xylylene diisocyanate, isophorone diisocyanate, bis(isocyanatomethyl) cyclohexane, bis(isocyanatocyclohexyl) methane, 2,5-bis(isocyanatomethyl) bicyclo-[2.2.1]-heptane, 2,6-bis(isocyanatomethyl) bicyclo-[2.2.1]-heptane, tolylene diisocyanate, 4,4'-diphenylmethane diisocyanate, and phenylene diisocyanate, yet still more preferably contains the isocyanate component A as a main component.

It is noted here the expression "contain the isocyanate component A as a main component" used herein means that a total content of the isocyanate component A is not less than 50% with respect to a total amount of the isocyanate compound used as a raw material of the thiourethane resin.

The total content of the isocyanate component A with respect to the total amount of the isocyanate compound is preferably not less than 60%, more preferably not less than 70% by mass, still more preferably not less than 80%.

Similarly, in the disclosure, a feature that a composition contains a certain component (hereinafter, referred to as "component X") "as a main component" means that the content of the component X (when the component X consists of two or more compounds, a total content of the two or more compounds) is not less than 50% with respect to a total amount of the composition.

The content of the component X as a main component with respect to the total amount of the composition is preferably not less than 60%, more preferably not less than 70%, still more preferably not less than 80%.

The "%" in the description of the above-described expression "contain . . . as a main component" means a ratio (% by area) of a total area of all peaks of the component X with respect to a total area of all peaks of the composition, which ratio is determined by high-performance liquid chromatography.

From the standpoint of the performance [for example, optical properties (e.g., refractive index and/or Abbe number), heat resistance, and specific gravity d] of the thiourethane resin, the isocyanate compound as a raw material of the thiourethane resin yet still more preferably contains at least one (hereinafter, also referred to as "isocyanate component A1") selected from the group consisting of m-xylylene diisocyanate, 2,5-bis(isocyanatomethyl) bicyclo-[2.2.1]-heptane, 2,6-bis(isocyanatomethyl) bicyclo-[2.2.1]-heptane, isophorone diisocyanate, bis(isocyanatomethyl) cyclohexane, and bis(isocyanatocyclohexyl) methane, further more preferably contains the isocyanate component A1 as a main component.

—Polythiol Composition as Raw Material of Thiourethane Resin—

The polythiol composition as a raw material of the thiourethane resin contains at least one polythiol compound.

The polythiol compound as a raw material of the thiourethane resin may be any compound containing two or more thiol groups (i.e., mercapto groups), and has no other particular limitation.

Examples of the polythiol compound contained in the polythiol composition as a raw material of the thiourethane resin include those known polythiol compounds that are described in the aforementioned known documents.

The polythiol composition as a raw material of the thiourethane resin preferably contains at least one (hereinafter, also referred to as "polythiol component A") selected from the group consisting of 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, pentaerythritol tetrakis (2-mercaptoacetate), pentaerythritol tetrakis(3-mercaptopropionate), 2,5-dimercaptomethyl-1,4-dithiane, bis(2-mercaptoethyl) sulfide, and diethylene glycol bis(3-mercaptopropionate).

The polythiol composition more preferably contains the polythiol component A as a main component.

In this case, the polythiol composition may contain at least one other component (e.g., other polythiol compound or a component other than the polythiol compound) in addition to the polythiol component A.

Examples of the other polythiol compound include methanedithiol, 1,2-ethanedithiol, 1,2,3-propanetrithiol, tetrakis (mercaptomethylthiomethyl) methane, tetrakis (2-mercaptoethylthiomethyl) methane, tetrakis (3-mercaptopropylthiomethyl) methane, bis(2,3-dimercaptopropyl) sulfide, 2,5-dimercapto-1,4-dithiane, 2,5-dimercaptomethyl-2,5-dimethyl-1,4-dithiane, 1,1,3,3-tetrakis(mercaptomethylthio) propane, 1,1,2,2-tetrakis(mercaptomethylthio) ethane, and 4,6-bis(mercaptomethylthio)-1,3-dithiane.

Examples of a more specific aspect of the polythiol composition as a raw material of the thiourethane resin include:

an aspect in which the polythiol composition contains 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (hereinafter, these three compounds are also collectively referred to as "polythiol component A1") as main components;

an aspect in which the polythiol composition contains 4-mercaptomethyl-1,8-dimercapto-3,6-dithiaoctane (hereinafter, also referred to as "polythiol component A2") as a main component;

an aspect in which the polythiol composition contains pentaerythritol tetrakis(3-mercaptopropionate) (hereinafter, also referred to as "polythiol component A3") as a main component;

an aspect in which the polythiol composition contains the polythiol component A1 and the polythiol component A3 as main components; and an aspect in which the polythiol composition contains the polythiol component A2 and the polythiol component A3 as main components.

The polythiol composition of each of the above-described aspects may contain at least one other component (e.g., other polythiol compound or a component other than the polythiol compound) in addition to the main component(s).

—Other Components—

The thiourethane resin may also contain at least one other component in addition to a polymer of the isocyanate compound and the polythiol composition.

With regard to other components that may be contained in the thiourethane resin, reference can be made as appropriate to the components that may be contained in the below-described polymerizable composition.

—Powder Containing Thiourethane Resin—

In the first step, it is preferred to bring a powder containing the thiourethane resin (hereinafter, also referred to as "thiourethane resin powder"), and an amine compound, into contact with each other to allow the thiourethane resin in the powder and the amine compound to react with each other. By this, the efficiency of the reaction between the thiourethane resin and the amine compound can be further improved.

A method of bringing the thiourethane resin powder and the amine compound into contact with each other is not particularly limited, and one example thereof is a method of charging the thiourethane resin powder and the amine compound (and a reaction solvent if necessary) into a reaction vessel and stirring the charged materials. In this example, the order of charging the thiourethane resin powder and the amine compound (and a reaction solvent if necessary) to the reaction vessel is not particularly limited.

The thiourethane resin powder is not particularly limited; however, it is preferably a cut powder (encompassing the concept of ground powder; the same applies hereinafter) of a formed body containing the thiourethane resin and/or the above-described cut powder applied to a sieve (i.e., the cut powder passed through the sieve).

The cut powder of a formed body containing the thiourethane resin is generated, for example, in the process of producing an optical material (e.g., a lens) by cutting the formed body containing the thiourethane resin.

Alternatively, the thiourethane resin powder may be a massive powder obtained by crushing and/or pulverizing a formed body containing the thiourethane resin.

(Resin Mixture Containing Thiourethane Resin)

The first step may also be a step of generating a polyurea compound by bringing a resin mixture containing a thiourethane resin and an amine compound A into contact with each other and thereby allowing the thiourethane resin in the resin mixture and the amine compound A to react with each other.

The resin mixture containing a thiourethane resin further contains components other than the thiourethane resin.

Examples of the components other than the thiourethane resin include a resin other than the thiourethane resin, and an inorganic material (e.g., glass) for lens production.

The resin other than the thiourethane resin is not particularly limited.

The scope of the resin mixture containing a thiourethane resin and a resin other than the thiourethane resin includes, for example:

a hybrid material of a thiourethane resin and a urethane resin, which is produced by adding a polyol compound to a raw material in production of the thiourethane resin; and a hybrid material of a thiourethane resin and a urea resin, which is produced by adding a polyamine compound to a raw material in production of the thiourethane resin.

Examples of the resin other than the thiourethane resin include:

a polyolefin film that protects the surface of a resin formed body for eyeglass lens production;

a hard coat or a primer coat that protects the surface of a resin formed body used eyeglass lens production;

an abrasive agent used for grinding a resin formed body for eyeglass lens production;

a resin material used for immobilizing a resin formed body for eyeglass lens production during cutting of the resin formed body; and a tape or a tape glue that is used for immobilizing a glass mold used in the preparation of a resin formed body for eyeglass lens production.

The resin mixture preferably contains, as a resin other than the thiourethane resin, at least one selected from the group consisting of a polycarbonate resin, a polyallylcarbonate resin, an acrylic resin, a urethane resin, and an episulfide resin.

These resins can also be obtained as eyeglass lens materials in the same manner as a thiourethane resin.

The resin mixture containing a thiourethane resin is preferably one collected in at least one of an eyeglass lens production process, an eyeglass production process, or an eyeglass disposal process.

The eyeglass lens production process, the eyeglass production process, and the eyeglass disposal process have the same meanings as described above.

The resin mixture containing a thiourethane resin preferably contains a cut powder containing the thiourethane resin.

(Amine Compound A)

As the amine compound A in the first step, any known amine compound can be used with no particular limitation.

In the first step, the amine compound A may be used singly, or in combination of two or more kinds thereof.

From the standpoint of further improving the reactivity between the thiourethane resin and the amine compound A, the molecular weight of the amine compound A is preferably 1,000 or less, more preferably 500 or less, still more preferably 300 or less, yet still more preferably 200 or less.

A lower limit of the molecular weight of the amine compound A is, for example, not less than 45, preferably not less than 59, more preferably not less than 60.

The amine compound A is preferably one which contains at least one of an amino group or a monoalkylamino group, and has a total number of amino groups and monoalkylamino groups of from 1 to 6 (preferably from 1 to 3, more preferably 1 or 2).

One preferred example of the amine compound A is an amine compound of 300 or less in molecular weight, which contains at least one of an amino group and a monoalkylamino group, and has a total number of amino groups and monoalkylamino groups of 1 or 2.

Specific examples of the amine compound A include alkylamines having from 2 to 10 carbon atoms, aralkylamines having from 7 to 10 carbon atoms (e.g., benzylamine), dialkylamines having from 2 to 10 carbon atoms (e.g., di-n-butylamine), alkyldiamines having from 2 to 10 carbon atoms (e.g., ethylenediamine and bis(2-aminoethyl) ether), alkyltriamines having from 2 to 10 carbon atoms (e.g., bis(2-aminoethyl)amine), hydroxyalkylamines having from 2 to 10 carbon atoms (e.g., monoethanolamine), bis(hydroxyalkyl)amines having from 2 to 10 carbon atoms (e.g., bis(hydroxyethyl)amine), cyclic amines having from 2 to 10 carbon atoms (e.g., morpholine), and secondary amines such as alkyl(hydroxyalkyl) amine having from 2 to 10 carbon atoms (e.g., methylethanolamine and isopropylethanolamine).

The amine compound A is preferably benzylamine, di-n-butylamine, ethylenediamine, monoethanolamine, morpholine, or methylethanolamine.

—Charged Amount of Amine Compound A—

In the first step, a charged mass ratio of the amine compound A with respect to the thiourethane resin (i.e., charged mass ratio [amine compound A/thiourethane resin]) can be adjusted as appropriate, and it is preferably 0.10 or higher but lower than 1.0.

When the charged mass ratio [amine compound A/thiourethane resin] is 0.10 or higher, the generation of a polyurea compound in the first step is further facilitated, as a result of which the amount of a polyamine compound generated in the second step is further increased.

When the charged mass ratio [amine compound A/thiourethane resin] is lower than 1.0, the amine compound A can be further prevented from remaining in a reaction mixture.

The charged mass ratio [amine compound A/thiourethane resin] is preferably from 0.15 to 0.95, more preferably from 0.20 to 0.90.

In the first step, the number of charged millimoles of the amine compound A with respect to 1 g of the thiourethane resin is preferably from 1.0 mmol/g to 30 mmol/g, more preferably from 2.0 mmol/g to 20 mmol/g, still more preferably from 3.0 mmol/g to 10.0 mmol/g.

In the first step, a charged equivalent of the amine compound A with respect to the thiourethane resin (charged equivalent [amine compound A/thiourethane resin]) is preferably from 1.0 to 2.0, more preferably more than 1.0 but 1.8 or less, still more preferably more than 1.0 but 1.6 or less.

When the charged equivalent [amine compound A/thiourethane resin] is 1.0 or more, the generation of a polyurea compound in the first step is further facilitated, as a result of which the amount of a polyamine compound generated in the second step is further increased.

When the charged equivalent [amine compound A/thiourethane resin] is 2.0 or less, the amine compound A can be further prevented from remaining in a reaction mixture.

It is noted here that the charged equivalent of the amine compound A with respect to the thiourethane resin (charged equivalent [amine compound A/thiourethane resin]) means a ratio of a total number of amino groups and monoalkylamino groups in the charged amine compound A with respect to a total number of thiourethane bonds in the charged thiourethane resin.

(First Reaction Solvent)

In the step of generating a thiourethane resin raw material, the thiourethane resin and the amine compound A are preferably reacted with each other in the presence of a reaction solvent (hereinafter, also referred to as "first reaction solvent").

The first reaction solvent is preferably a hydrocarbon compound having from 5 to 12 (preferably from 6 to 10, more preferably from 7 to 9) carbon atoms, an ether compound having from 4 to 12 carbon atoms, a ketone compound having from 3 to 12 carbon atoms, an ester compound having from 4 to 12 carbon atoms, an alcohol compound having from 2 to 12 carbon atoms, or a nitrile compound having from 2 to 12 carbon atoms.

The above-described hydrocarbon compound is preferably hexane, heptane, octane, nonane, decane, xylene, mesitylene, or toluene, more preferably heptane, octane, nonane, xylene, mesitylene, or toluene, particularly preferably xylene or toluene.

The above-described ether compound is preferably diethyl ether, tetrahydrofuran, 2-methyltetrahydrofuran, dimethoxyethane, or 1,4-dioxane, particularly preferably dimethoxyethane.

The above-described ketone compound is preferably acetone, methyl ethyl ketone, methyl isobutyl ketone, or 2-octanone, particularly preferably methyl isobutyl ketone.

The above-described ester compound is preferably ethyl acetate, butyl acetate, or pentyl acetate, particularly preferably pentyl acetate.

The above-described alcohol compound is preferably ethanol, 1-propanol, isopropanol, I-butanol, 1-octanol, 2-octanol, benzyl alcohol, phenethyl alcohol, ethylene glycol, propylene glycol, or methyl cellosolve, particularly preferably benzyl alcohol or ethylene glycol.

The above-described nitrile compound is preferably acetonitrile or propionitrile, particularly preferably acetonitrile.

As the reaction solvent, these compounds may be used singly, or in combination of two or more kinds thereof.

(First Reaction Temperature)

A reaction temperature of the thiourethane resin and the amine compound A in the first step (hereinafter, also referred to as "first reaction temperature") is adjusted as appropriate.

In the first step, the thiourethane resin and the amine compound A are preferably reacted under a temperature condition (i.e., first reaction temperature) of from 50° C. to 150° C. (more preferably from 60° C. to 145° C., still more preferably from 70° C. to 140° C.).

(First Reaction Time)

A reaction time of the thiourethane resin and the amine compound A in the first step can be adjusted as appropriate, and it is preferably from 0.1 hours to 20 hours, more preferably from 0.5 hours to 16 hours, still more preferably from 1 hour to 10 hours.

(Polyurea Compound)

The polyurea compound generated in the first step is an aminolysis product of the thiourethane resin, which is generated by a reaction between the thiourethane resin and the amine compound A (i.e., first aminolysis).

The polyurea compound is a compound containing two or more urea bonds.

The polyurea compound is, for example, a polyurea compound having a structure in which urea bonds are formed by reaction between all of the isocyanato groups in the polyisocyanate compound that is one of the raw materials of the thiourethane resin and the amino groups or monoalkylamino groups of the amine compound A. In the disclosure, a polyurea compound having this structure may be referred to as "urea body" formed of a polyamine compound (e.g., m-xylenediamine (XDA)) corresponding to the polyisocyanate compound that is one of the raw materials (e.g., m-xylene diisocyanate (XDI)) and the amine compound A (e.g., monoethanolamine (MEA)). It is noted here that the "polyamine compound corresponding to the polyisocyanate compound" means a compound obtained by substituting all of the isocyanato groups in the polyisocyanate compound with amino groups. The polyamine compound corresponding to the polyisocyanate compound is a target material in the method of producing a polyamine compound according to the first embodiment.

(First Reaction Step and First Separation Step)

The first step may include:

a reaction step of reacting the thiourethane resin and the amine compound A with each other to obtain a reaction mixture that contains a polyurea-containing mixture containing a polyurea compound; and a separation step of separating the polyurea-containing mixture from the reaction mixture.

In this case, in the below-described second step, the polyurea-containing mixture separated in the above-described first separation step and an amine compound B are mixed with each other to allow the polyurea compound in the polyurea-containing mixture and the amine compound B to react with each other.

The term "polyurea-containing mixture" used herein means a mixture of two or more kinds of urea compounds, including a polyurea compound.

Hereinafter, the above-described reaction mixture, reaction step, and separation step are also referred to as "first reaction mixture", "first reaction step", and "first separation step", respectively.

A preferred aspect of the reaction in the first reaction step is as described above.

A separation method in the first separation step is not particularly limited, and any known method can be applied.

Examples of the separation method in the first separation step include filtration, decantation, extraction, distillation, drying (including vacuum drying), and purification (e.g., column chromatography). These separation methods may be used in combination of two or more thereof.

In the first reaction step, when the polyurea-containing mixture is generated as a solid, the first separation step preferably includes filtering the first reaction mixture to obtain the polyurea-containing mixture as a filtration residue. The thus obtained filtration residue may be subjected to operations such as washing.

In this case, a filtrate obtained by the filtration of the first reaction mixture may contain a polythiol composition, which is a by-product generated by aminolysis reaction (particularly a by-product when the polyurea-containing mixture is a main product). With regard to a preferred aspect of the polythiol composition generated as a by-product, reference can be made as appropriate to the above-described preferred aspect of the polythiol composition as a raw material of the thiourethane resin.

The polythiol composition generated as a by-product by aminolysis reaction can be utilized as a raw material for production of a new thiourethane resin. By this, effective utilization (i.e., recycle) of the material is realized.

In the first reaction step, when the polyurea-containing mixture is generated in the form of a liquid and has a property of not dissolving in a reaction solvent, the first separation step preferably includes obtaining the polyurea-containing mixture as an extraction residue by a decantation method where a supernatant is repeatedly separated, extracted, and washed. The thus obtained extraction residue may also be subjected to operations such as washing.

In this case, the supernatant may contain a polythiol composition, which is a by-product generated by aminolysis reaction (particularly a by-product when the polyurea-containing mixture is a main product). With regard to a preferred aspect of the polythiol composition generated as a by-product, reference can be made as appropriate to the above-described preferred aspect of the polythiol composition as a raw material of the thiourethane resin.

The polythiol composition generated as a by-product by aminolysis reaction can be utilized as a raw material for production of a new thiourethane resin. By this, effective utilization (i.e., recycle) of the material is realized.

In the first reaction step, when the polyurea-containing mixture is dissolved in the first reaction solvent, the first separation step preferably includes:

filtering the first reaction mixture to obtain a filtrate;
adding an alkali metal-containing base and then water to the filtrate to perform extraction and thereby remove an alkali metal salt of a polythiol composition generated as a by-product from the filtrate; and
separating the polyurea-containing mixture from the filtrate from which the alkali metal salt has been removed.

The separation of the polyurea-containing mixture from the filtrate from which the alkali metal salt has been removed can be performed by, for example, a concentration method or a drying method.

<Second Step>

The second step is the step of generating a polyamine compound as a target material by reacting the polyurea compound generated in the first step and an amine compound B with each other.

In the second step, the polyurea-containing mixture separated in the above-described first separation step and the amine compound B may be mixed with each other to allow the polyurea compound in the polyurea-containing mixture and the amine compound B to react with each other.

The reaction in the second step (second aminolysis) has a higher polyamine compound generation efficiency as compared to a known reaction in which a polyamine compound is obtained by a reaction between a polyurea compound and sodium hydroxide (see, for example, the below-described Comparative Example 1). As a result, the amount of the polyamine compound generated can be increased as compared to a case where the above-described known reaction is applied. This effect can be verified by analyzing a reaction mixture obtained in the second step by gas chromatography (GC).

(Amine Compound B)

As the amine compound B in the second step, any known amine compound can be used with no particular limitation.

In the second step, the amine compound B may be used singly, or in combination of two or more kinds thereof.

A preferred aspect of the amine compound B used in the second step is the same as that of the amine compound A used in the first step. It is noted here, however, that the amine compound A and the amine compound B may be the same or different.

One preferred aspect of the amine compound A is an aspect in which the amine compound A is an amine compound of 300 or less in molecular weight, which contains at least one of an amino group or a monoalkylamino group, and has a total number of amino groups and monoalkylamino groups of 1 or 2.

One preferred aspect of the amine compound B is an aspect in which the amine compound B is an amine compound of 2,000 or less in molecular weight, which contains at least one of an amino group or a monoalkylamino group, and has a total number of amino groups and monoalkylamino groups of from 1 to 50.

From the standpoint of the reactivity with the polyurea compound, the amine compound B preferably contains an amino group.

From the standpoint of enabling to further increase a second reaction temperature, the amine compound B is preferably an amine compound having a boiling point of 100° C. or higher.

From the standpoint of the ease of removal by distillation after the reaction, the amine compound B may be an amine compound having a boiling point of 200° C. or lower.

From the standpoint of the volumetric efficiency, the amine compound B is preferably an amine compound having a molecular weight of 200 or less (more preferably 150 or less) per amino group in the compound.

Specific examples of the amine compound B include benzylamine, monoethanolamine, hexylamine, heptylamine, octylamine, aminopropanol, propylenediamine, 1,3-propanediamine, diethylenetriamine, triethylenetetramine, tetraethylenepentamine, aminoethylethanolamine, and polyethylene imine.

The amine compound B is preferably 1,3-propanediamine, diethylenetriamine, aminoethylethanolamine, benzylamine, or monoethanolamine, particularly preferably aminoethylethanolamine, diethylenetriamine, or monoethanolamine.

From the standpoint of inhibiting a reverse reaction (i.e., reaction between a polyamine compound that is a target material and a reaction by-product), there are cases where it is preferred that the amine compound B contains at least one of an amino group or a monoalkylamino group and has a total number of amino groups and monoalkylamino groups of 2 or more. In such a case, a by-product of the reaction in the second step may be a cyclic urea compound and, since such a cyclic urea compound has excellent stability, the reverse reaction can be inhibited. As a result, not only the generation ratio of a polyamine compound as a target material but also the generation rate are increased so that the reaction time may be shortened.

In addition, when the amine compound B contains at least one of an amino group or a monoalkylamino group and has a total number of amino groups and monoalkylamino groups of 2 or more, the reverse reaction can be inhibited; therefore, there are advantages in that a polyamine compound can be easily separated from a reaction mixture containing the polyamine compound and reaction by-product by a distillation method, and that the amine compound A used in the first step can be easily collected.

Specific examples of the amine compound B expected to provide such effects include propylenediamine, 1,3-propanediamine, diethylenetriamine, triethylenetetramine, tetraethylenepentamine, aminoethylethanolamine, and polyethylene imine.

The amine compound B is preferably 1,3-propanediamine, diethylenetriamine, triethylenetetramine, tetraethylenepentamine, or aminoethylethanolamine, particularly preferably aminoethylethanolamine or diethylenetriamine.

In the second step, a charged equivalent of the amine compound B with respect to the polyurea compound (charged equivalent [amine compound B/polyurea compound]) is preferably from 0.1 to 50, more preferably from 0.15 to 45, still more preferably from 0.2 to 40.

When the charged equivalent [amine compound B/polyurea compound] is 0.1 or more, the generation of a polyamine compound is further facilitated.

When the charged equivalent [amine compound B/polyurea compound] is 50 or less, there is an advantage in terms of reducing the amount of the amine compound B to be used.

It is noted here that the charged equivalent of the amine compound B with respect to the polyurea compound (charged equivalent [amine compound B/polyurea compound]) means a ratio of a total number of amino groups and monoalkylamino groups in the charged amine compound B with respect to a total number of urea bonds in the charged polyurea compound.

In the second step, when the polyurea-containing mixture separated in the above-described first separation step and the amine compound B are mixed with each other to allow the polyurea compound in the polyurea-containing mixture and the amine compound B to react with each other, the charged equivalent [amine compound B/polyurea compound] may be determined based on an assumption that the whole amount of the polyurea-containing mixture is the polyurea compound.

In the second step, the polyurea compound and the amine compound B can be reacted with each other in the absence of a reaction solvent. For example, the polyurea-containing mixture containing the polyurea compound and the amine compound B may be directly mixed with each other in the absence of a reaction solvent to allow the polyurea compound and the amine compound B to react with each other in the absence of a reaction solvent.

However, in the second step, the polyurea compound and the amine compound B may be reacted with each other in the presence of a reaction solvent.

When the polyurea compound and the amine compound B are reacted with each other in the second step, it may be preferable to allow an inorganic base to coexist with the polyurea compound and the amine compound B. In this case, a reaction by-product of the above-described reaction (e.g., a cyclic urea compound such as an imidazolidinone compound) and the inorganic base react with each other, and the reaction by-product can thereby be decomposed into the amine compound B and a carbonate. As a result, the amine compound B can be collected.

This effect can be expected not only when the polyurea compound, the amine compound B, and the inorganic base are simultaneously added and reacted, but also when the inorganic base is added to and reacted with a reaction mixture obtained by a reaction between the polyurea compound and the amine compound B.

Further, the above-described effect is more effectively exerted when the amine compound B contains at least one of an amino group or a monoalkylamino group and has a total number of amino groups and monoalkylamino groups of 2 or more.

Specific examples of the inorganic base include sodium hydroxide, potassium hydroxide, and lithium hydroxide.

In the second step, when the inorganic base is allowed to coexist in addition to the polyurea compound and the amine compound B, a charged equivalent of the inorganic base (charged equivalent [inorganic base/polyurea compound]) is preferably from 0.5 to 5, more preferably from 1 to 4, still more preferably from 1.5 to 3.

When the charged equivalent [inorganic base/polyurea compound] is 0.5 or more, the generation of the amine compound B from a reaction by-product is further facilitated.

When the charged equivalent [inorganic base/polyurea compound] is 5 or less, there is an advantage in terms of reducing the amount of the inorganic base to be used.

It is noted here that the charged equivalent of the inorganic base with respect to the polyurea compound (charged equivalent [inorganic base/polyurea compound]) means a ratio of a total number of inorganic bases with respect to a total number of urea bonds in the charged polyurea compound.

In the second step, when the polyurea-containing mixture separated in the above-described first separation step and the inorganic base are mixed with each other to allow the polyurea compound in the polyurea-containing mixture and the inorganic base to react with each other, the charged equivalent [inorganic base/polyurea compound] may be determined based on an assumption that the whole amount of the polyurea-containing mixture is the polyurea compound.

(Second Reaction Temperature)

A reaction temperature of the polyurea compound and the amine compound B in the second step (hereinafter, also referred to as "second reaction temperature") is adjusted as appropriate.

In the second step, the polyurea compound and the amine compound B are preferably reacted with each other under a temperature condition (i.e., second reaction temperature) of from 80° C. to 180° C. (more preferably from 90° C. to 180° C., still more preferably from 100° C. to 180° C., yet still more preferably from 110° C. to 170° C., further more preferably from 120° C. to 160° C.).

Further, in the second step, the reaction may be performed under a pressurized condition. When the reaction is performed under a pressurized condition, the reaction time may be shortened.

(Second Reaction Time)

A reaction time of the polyurea compound and the amine compound B in the second step can be adjusted as appropriate, and it is preferably from 0.1 hours to 40 hours, more preferably from 0.5 hours to 20 hours, still more preferably from 1 hour to 10 hours.

(Second Reaction Step and Second Separation Step)

The second step may include:
a reaction step of reacting the polyurea compound and the amine compound B with each other to obtain a reaction mixture containing a polyamine compound; and
a separation step of separating the polyamine compound from the reaction mixture.

Hereinafter, the above-described reaction mixture, reaction step, and separation step are also referred to as "second reaction mixture", "second reaction step", and "second separation step", respectively.

A preferred aspect of the reaction in the second reaction step is as described above.

A separation method in the second separation step is not particularly limited, and any known method can be applied.

Examples of the separation method in the second separation step include filtration, decantation, washing, extraction, distillation, decompression (e.g., vacuuming), and purification (e.g., column chromatography). These separation methods may be used in combination of two or more thereof.

One example of a preferred aspect of the second separation step is an aspect (hereinafter, referred to as "second separation aspect C") in which the second separation step includes:
extracting the polyamine compound from the second reaction mixture using a second extraction solvent to obtain an extract; and
separating the polyamine compound from the extract.

In the second separation aspect C, the polyamine compound is not directly separated from the second reaction mixture, but is rather separated from an extract obtained by extracting the polyamine compound from the second reaction mixture. By this, the isolated yield of the polyamine compound eventually obtained is further improved. The reason for this is not clear; however, it is believed to be because disproportionation (particularly a reaction in which the polyamine compound is converted back to the polyurea compound) in the second separation step is further inhibited.

Another example of a preferred aspect of the second separation step is an aspect in which the second separation step includes separating the polyamine compound from the second reaction mixture by a distillation method.

For example, as described above, when the amine compound B contains at least one of an amino group or a monoalkylamino group and has a total number of amino groups and monoalkylamino groups of 2 or more, a by-product of the reaction in the second step may be a cyclic urea compound having excellent stability. In this case, a reaction between the polyamine compound that is a target material and the reaction by-product (i.e., cyclic urea compound) is inhibited; therefore, the separation of the polyamine compound by a distillation method can be performed more easily.

When the polyamine compound is separated from the second reaction mixture by a distillation method, insoluble components may be removed from the second reaction mixture by filtration, and the polyamine compound may be subsequently separated by a distillation method from the second reaction mixture from which insoluble components have been removed.

When insoluble components are removed from the second reaction mixture by filtration, the second reaction mixture may be diluted prior to the filtration, and the thus diluted second reaction mixture may be filtered.

Examples of the second extraction solvent in the second separation aspect C include hydrocarbon compounds.

For example, when a hydrocarbon compound is used as the second extraction solvent, a preferred aspect of the hydrocarbon compound as the second extraction solvent is, for example, the above-described preferred aspect of the hydrocarbon compound used as the first reaction solvent. However, in this case, the hydrocarbon compound used as the second extraction solvent may be the same as or different from the hydrocarbon compound used as the first reaction solvent.

The operation of separating the polyamine compound from an extract in the second separation aspect C preferably includes distillation.

(Polyamine Compound as Target Material)

In the method of producing a polyamine compound according to the first embodiment, the polyamine compound as a target material is an aminolysis product of the thiourethane resin, which is generated by a reaction between the polyurea compound and the amine compound B (i.e., second aminolysis).

The polyamine compound as a target material is preferably a polyamine compound corresponding to the polyisocyanate compound used as a raw material of the thiourethane resin that is a starting material in the first step (particularly the polyisocyanate compound in which isocyanato groups are substituted with amino groups).

The polyamine compound as a target material may be any compound containing two or more amino groups.

The polyamine compound as a target material preferably contains a diamine compound containing two amino groups, more preferably contains at least one (hereinafter, also referred to as "polyamine component A") selected from the group consisting of pentamethylenediamine, hexamethylenediamine, m-xylylenediamine, p-xylylenediamine, isophoronediamine, bis(aminomethyl)cyclohexane, bis(aminocyclohexyl) methane, 2,5-bis(aminomethyl) bicyclo-[2.2.1]-heptane, 2,6-bis(aminomethyl) bicyclo-[2.2.1]-heptane, tolylenediamine, 4,4'-diphenylmethanediamine, and phenylenediamine, still more preferably contains the polyamine component A as a main component.

The polyamine compound as a target material yet still more preferably contains at least one selected from the group consisting of m-xylylenediamine, 2,5-bis(aminomethyl) bicyclo-[2.2.1]-heptane, isophorone diisocyanate, bis (isocyanatomethyl)cyclohexane, bis(isocyanatocyclohexyl) methane, and 2,6-bis(aminomethyl) bicyclo-[2.2.1]-heptane (hereinafter, also referred to as "polyamine component A1"), further more preferably contains the polyamine component A1 as a main component.

The use of the polyamine compound that is a target material is not particularly limited, and the polyamine compound can be applied to various uses.

The polyamine compound that is a target material can be used as, for example, a raw material of a polyisocyanate compound.

The resulting polyisocyanate compound can be used for, for example, production of a thiourethane resin or a urethane resin.

One example of specific use of the resulting polyisocyanate compound is the use for production of an optical material (e.g., a lens).

In other words, one specific example of the method of producing a polyamine compound according to the first embodiment is a method of producing a polyamine compound used as a raw material of a polyisocyanate compound for production of an optical material. In this specific example, when a cut powder containing a thiourethane resin, which is generated in production of an optical material, is used as a starting material, effective utilization (i.e., recycle) of materials (the thiourethane resin and the polyisocyanate compound) is realized effectively.

<Sieving Step>

The method of producing a polyamine compound according to the first embodiment may further include, prior to the first step, the sieving step of applying a cut powder containing the thiourethane resin to a sieve to obtain the powder containing the thiourethane resin, which has passed through the sieve (i.e., the cut powder passed through the sieve). In this case, in the first step, the powder obtained in the sieving step and the amine compound A are brought into contact with each other to allow the thiourethane resin in the powder and the amine compound A to react with each other.

When the method of producing a polyamine compound according to the first embodiment includes this sieving step, since the powder consisting of particles having a small particle size and the amine compound A are brought into contact with each other in the first step, the reaction between the thiourethane resin and the amine compound A (i.e., polyurea compound generation reaction) can be further facilitated. As a result, the amount of the polyamine compound generated as a final target material can be further increased.

The above-described sieve is not particularly limited.

The nominal mesh size of the sieve, which is defined by JIS Z-8801-1:2019, is, for example, from 0.1 mm to 20 mm, preferably from 0.1 mm to 10 mm, more preferably from 0.1 mm to 5 mm, still more preferably from 0.1 mm to 2 mm, yet still more preferably from 0.3 mm to 2 mm, further more preferably from 0.5 mm to 1.5 mm.

The method of producing a polyamine compound according to the first embodiment may further include, prior to the first step, the classification step in the method of producing a polyamine compound according to the second embodiment.

<Washing Step>

The method of producing a polyamine compound according to the first embodiment may further include, prior to the first step, a washing step of washing the thiourethane resin powder (i.e., powder containing the thiourethane resin) using a hydrocarbon compound having from 5 to 12 carbon atoms as a washing solvent. In this case, in the first step, the thiourethane resin in the thiourethane resin powder washed in the washing step and the amine compound A are allowed to react with each other. By this, the reaction between the thiourethane resin and the amine compound A (i.e., polyurea compound generation reaction) can be further facilitated. As a result, the amount of the polyamine compound generated as a final target material can be further increased.

Particularly, in the method of producing a polyamine compound according to the first embodiment, when a cut powder containing the thiourethane resin is used as a starting material, an oil adhering to the cut powder, which is originated from a cutting machine, can be effectively removed by the washing step; therefore, the above-described effects are exerted more effectively.

The hydrocarbon compound as the washing solvent may be used singly, or in combination of two or more kinds thereof.

A preferred aspect of the hydrocarbon compound used as the washing solvent is the same as that of the hydrocarbon compound used as the above-described first reaction solvent.

It is noted here, however, that the first reaction solvent and the washing solvent may be the same or different.

A washing method in the washing step is not particularly limited, and any known method, such as a method of adding the above-described washing solvent to the thiourethane resin powder and mixing the resultant, can be applied.

When the method of producing a polyamine compound according to the first embodiment includes the above-described sieving step and washing step, the sieving step and the washing step are preferably performed in this order. In this case, since it is not necessary to wash the cut powder not passing through the sieve, the amount of the washing solvent to be used can be further reduced.

[Method of Producing Polyisocyanate Compound]

The method of producing a polyisocyanate compound according to the first embodiment of the disclosure includes:
the step of producing a polyamine compound by the above-described method of producing a polyamine compound according to the first embodiment; and
the step of obtaining a polyisocyanate compound by reacting at least one of the polyamine compound or a hydrochloride of the polyamine compound and carbonyl dichloride with each other.

According to this method of producing a polyisocyanate compound, a polyisocyanate compound can be obtained as a target material using a thiourethane resin as a starting material; therefore, effective utilization of materials (the thiourethane resin and the polyisocyanate compound that is a raw material of the thiourethane resin) is realized.

The use of the polyisocyanate compound produced by the method of producing a polyisocyanate compound according to the first embodiment is not particularly limited, and the polyisocyanate compound can be applied to various uses.

The polyisocyanate compound can be used for, for example, production of a thiourethane resin or a urethane resin.

One example of specific use of the polyisocyanate compound that is a target material is the use for production of an optical material (e.g., a lens).

In other words, one specific example of the method of producing a polyisocyanate compound according to the first embodiment is a method of producing a polyisocyanate compound for production of an optical material. In this specific example, when a cut powder containing a thiourethane resin, which is generated in production of an optical material, is used as a starting material, effective utilization (i.e., recycle) of materials (the thiourethane resin and the polyisocyanate compound) is realized effectively.

In the step of obtaining a polyisocyanate compound, at least one of the polyamine compound or a hydrochloride of the polyamine compound and carbonyl dichloride (hereinafter, also referred to as "phosgene") are reacted with each other to convert the amino groups in the polyamine compound into isocyanato groups, whereby a polyisocyanate compound can be obtained.

This reaction itself is known, and reference can be made as appropriate to a known method of producing a polyisocyanate compound.

[Method of Producing Polymerizable Composition]

The method of producing a polymerizable composition according to the first embodiment of the disclosure includes:
the step of producing a polyisocyanate compound by the above-described method of producing a polyisocyanate compound according to the first embodiment; and
the step of obtaining a polymerizable composition containing the polyisocyanate compound and an active hydrogen compound by mixing at least the polyisocyanate compound and the active hydrogen compound.

The method of producing a polymerizable composition according to the first embodiment, if necessary, may also include other steps.

In the method of producing a polymerizable composition according to the first embodiment:
in the step of producing a polyisocyanate compound, a polyisocyanate compound is produced using a thiourethane resin (e.g., a thiourethane resin contained in a ground powder of a formed body of the thiourethane resin) as a starting material; and
in the step of obtaining a polymerizable composition, a polymerizable composition containing the thus produced polyisocyanate compound and an active hydrogen compound is produced.

The thus obtained polymerizable composition can be used again for production of a thiourethane resin.

In this manner, in the method of producing a polymerizable composition according to the first embodiment, effective utilization (i.e., recycle) of materials (i.e., a thiourethane resin and a polyisocyanate compound that is a raw material of the thiourethane resin) is realized.

<Step of Producing Polyisocyanate Compound>

With regard to the step of producing a polyisocyanate compound, reference can be made as appropriate to the above-described method of producing a polyisocyanate compound according to the first embodiment.

<Step of Obtaining Polymerizable Composition>

In the step of obtaining a polymerizable composition, at least the above-described polyisocyanate compound and an active hydrogen compound are mixed to obtain a polymerizable composition containing the polyisocyanate compound and the active hydrogen compound.

Examples of the active hydrogen compound include polythiol compounds, polyol compounds, and polyamine compounds.

These active hydrogen compounds may be used singly, or in combination of two or more kinds thereof.

The active hydrogen compound is preferably a polythiol composition.

A preferred aspect of the polythiol composition as the active hydrogen compound is the same as that of the "polythiol composition as a raw material of a thiourethane resin" described in the section of "Method of Producing Polyamine Compound".

In the step of obtaining a polymerizable composition, a mixing ratio of the active hydrogen compound and the polyisocyanate compound is not particularly limited.

In the step of obtaining a polymerizable composition, a ratio of the charged mass of the active hydrogen compound with respect to the charged mass of the polyisocyanate compound (i.e., charged mass [active hydrogen compound/polyisocyanate compound]) is preferably from 0.10 to 10.0, more preferably from 0.20 to 5.00, still more preferably from 0.50 to 1.50, yet still more preferably from 0.70 to 1.30.

Further, a molar ratio between the mercapto groups of the polythiol compound contained in the polythiol composition and the isocyanato groups of the polyisocyanate compound (mercapto groups/isocyanato groups) is preferably from 0.5 to 3.0, more preferably from 0.6 to 2.0, still more preferably from 0.8 to 1.3.

In the step of obtaining a polymerizable composition, a total charged mass of the active hydrogen compound and the polyisocyanate compound is not particularly limited; however, it is preferably not less than 60% by mass, more preferably not less than 80% by mass, still more preferably not less than 90% by mass, with respect to a total amount of the polymerizable composition to be produced.

In the step of obtaining a polymerizable composition, at least at least the above-described polyisocyanate compound and active hydrogen compound are mixed and, if necessary, other components may also be mixed along with the polyisocyanate compound and the active hydrogen compound.

In the step of obtaining a polymerizable composition, after mixing the polyisocyanate compound and the active hydrogen compound, other components may be added to the resulting mixture.

Examples of these other components include a polymerization catalyst, an internal mold release agent, a resin modifier, a chain extender, a crosslinking agent, a radical scavenger, a light stabilizer, a UV absorber, an antioxidant, an oil-soluble dye, a filler, an adhesion improver, an antimicrobial agent, an antistatic agent, a dye, a fluorescent brightener, a fluorescent pigment, and an inorganic pigment.

Examples of the polymerization catalyst include tertiary amine compounds, inorganic and organic acid salts thereof, metal compounds, quaternary ammonium salts, and organic sulfonic acids.

As the internal mold release agent, an acidic phosphoric acid ester can be used. Examples of the acidic phosphoric acid ester include phosphoric acid monoesters and phosphoric acid diesters, and these may be used singly, or in combination of two or more kinds thereof.

Examples of the resin modifier include episulfide compounds, alcohol compounds, amine compounds, epoxy compounds, organic acids, organic acid anhydrides, and olefin compounds containing a (meth) acrylate compound or the like. The term "(meth) acrylate compound" used herein means at least one of an acrylate compound or a methacrylate compound.

In the step of obtaining a polymerizable composition, the above-described components can be mixed in accordance with a conventional method, and a mixing method is not particularly limited.

[Method of Producing Resin]

The method of producing a resin according to the first embodiment of the disclosure includes:

the step of producing a polymerizable composition by the above-described method of producing a polymerizable composition according to the first embodiment; and
the step of obtaining a resin by curing the polymerizable composition.

The method of producing a resin according to the first embodiment, if necessary, may also include other steps.

According to the method of producing a resin according to the first embodiment, the same effects as those of the above-described method of producing a polymerizable composition according to the first embodiment are exerted.

The resin produced by the method of producing a resin according to the first embodiment and the below-described resin according to the first embodiment are both urethane resins or thiourethane resins, and they are each hereinafter simply referred to as "resin" so as to distinguish them from a thiourethane resin that is a starting material of a polyamine compound.

In the step of obtaining a resin, a resin is obtained by curing the above-described polymerizable composition.

The polymerizable composition can be cured by polymerizing the monomers contained in the polymerizable composition (specifically the polythiol composition and the polyisocyanate compound; the same applies hereinafter). As a pretreatment of this polymerization, the polymerizable composition may be subjected to filtration, degassing, and the like.

The conditions for the polymerization of the monomers contained in the polymerizable composition (e.g., polymerization temperature and polymerization time) are set as appropriate, taking into consideration the formulation of the composition, the types and the amounts of the monomers used in the composition, the type and the amount of a polymerization catalyst used in the composition, and the properties of the below-described mold if used, and the like.

The polymerization temperature is, for example, from $-50°$ C. to $150°$ C., or from $10°$ C. to $150°$ C.

The polymerization time is, for example, from 1 hour to 200 hours, or from 1 hour to 80 hours.

In the step of obtaining a resin, a resin may be obtained by performing a treatment such as annealing on a polymer obtained by the polymerization of the monomers.

The temperature of this annealing is, for example, from $50°$ C. to $150°$ C., from $90°$ C. to $140°$ C., or from $100°$ C. to $130°$ C.

[Method of Producing Formed Body]

The method of producing a formed body according to the first embodiment of the disclosure is a method of producing a resin-containing formed body, and includes:

the step of producing a polymerizable composition by the above-described method of producing a polymerizable composition according to the first embodiment; and
the step of obtaining a resin-containing formed body by curing the polymerizable composition.

The method of producing a formed body according to the first embodiment, if necessary, may also include other steps, According to the method of producing a formed body according to the first embodiment, the same effects as those of the above-described method of producing a polymerizable composition according to the first embodiment are exerted.

In the step of obtaining a resin-containing formed body, a resin-containing formed body is obtained by curing the above-described polymerizable composition.

With regard to preferred conditions for the curing of the polymerizable composition, i.e., the polymerization of the monomers contained in the polymerizable composition, reference can be made as appropriate to the above section of "Method of Producing Resin".

One example of the polymerization in this step is cast polymerization.

In the cast polymerization, first, the above-described polymerizable composition is injected between casting molds held by a gasket, a tape, or the like. In this process, if necessary, a defoaming treatment, a filtration treatment, and the like may be performed.

Next, the monomers contained in the polymerizable composition injected between the casting molds are polymerized to cure the composition between the casting molds and thereby obtain a cured product. Subsequently, the cured product is removed from the casting molds to obtain a resin-containing formed body.

The polymerization of the monomers may also be performed by heating the polymerizable composition. This heating can be performed using, for example, a heating apparatus equipped with a mechanism for heating a material to be heated in an oven, water, or the like.

From the standpoint of heat resistance, the resin (or formed body) according to the first embodiment has a glass transition temperature Tg of preferably 70° C. or higher, more preferably 80° C. or higher, still more preferably 85° C. or higher.

The glass transition temperature Tg may be 130° C. or lower, 120° C. or lower, or 110° C. or lower.

From the standpoint of application to an optical material, the resin (or formed body) according to the first embodiment has a refractive index (ne) of preferably 1.500 or higher, more preferably 1.540 or higher, still more preferably 1.590 or higher.

An upper limit of the refractive index (ne) is not particularly limited, and it is, for example, 1.750.

From the standpoint of application to an optical material, the resin (or formed body) according to the first embodiment has an Abbe number of preferably 28 or greater, more preferably 30 or greater.

An upper limit of the Abbe number is not particularly limited, and it is, for example, 50, preferably 45.

From the standpoint of application to an optical material, the resin (or formed body) according to the first embodiment has a specific gravity d of preferably 1.10 or higher, more preferably 1.20 or higher.

An upper limit of the specific gravity d is not particularly limited, and it is, for example, 1.50, preferably 1.40.

[Method of Producing Optical Material and Method of Producing Lens]

The method of producing an optical material (e.g., a lens) according to the first embodiment of the disclosure is a method of producing an optical material (e.g., a lens) containing a resin-containing formed body, and includes:

the step of producing a polymerizable composition by the above-described method of producing a polymerizable composition according to the first embodiment; and the step of obtaining a resin-containing formed body by curing the polymerizable composition.

The method of producing an optical material (e.g., a lens; the same applies hereinafter) according to the first embodiment, if necessary, may also include other steps.

According to the method of producing an optical material according to the first embodiment, the same effects as those of the above-described method of producing a polymerizable composition according to the first embodiment are exerted.

The method of producing an optical material according to the first embodiment is an application of the method of producing a formed body according to the first embodiment.

For example, by appropriately selecting the shape of the casting molds used in the above-described cast polymerization in the method of producing a formed body according to the first embodiment, a formed body that is applicable to an optical material (e.g., a lens) can be obtained.

Examples of the optical material include lenses (e.g., eyeglass lenses, camera lenses, and polarizing lenses), and light-emitting diodes (LEDs).

The method of producing an optical material (e.g., a lens) according to the first embodiment may also include the step of forming a coating layer on one side or both sides of a resin-containing formed body.

Specific examples of the coating layer include a primer layer, a hard coat layer, an anti-reflection layer, an anti-fog coating layer, an anti-fouling layer, and a water-repellent layer.

These coating layers may each be formed singly, or plural coating layers may be formed in the form of a multilayer structure. When coating layers are formed on both sides, the same coating layer may be formed on the respective sides, or different coating layers may be formed on the respective sides.

Components of the coating layer can be selected as appropriate in accordance with the intended purpose.

Examples of the components of the coating layer include a resin (e.g., a urethane resin, an epoxy resin, a polyester resin, a melamine resin, or a polyvinyl acetal resin), an infrared absorber, a light stabilizer, an antioxidant, a photochromic compound, a dye, a pigment, and an antistatic agent.

With regard to the eyeglass lens and the coating layer, reference can be made as appropriate to the descriptions of known documents, such as WO 2017/047745.

Second Embodiment

[Method of Producing Polyamine Compound]

The method of producing a polyamine compound according to the second embodiment of the disclosure includes:

a step X1 of generating a polycarbamate compound by reacting a thiourethane resin and an alcohol compound with each other in the presence of an amine compound XA that is a tertiary amine compound; and a step X2 of generating a polyamine compound by reacting the poly carbamate compound and an amine compound XB with each other.

According to the method of producing a polyamine compound according to the second embodiment, a polyamine compound can be produced as a target material using a thiourethane resin as a starting material.

Particularly, in the step X1, alcoholysis, which is a reaction in which the thiourethane resin is decomposed by the alcohol compound in the presence of the amine compound XA that is a tertiary amine compound, occurs, and a polycarbamate compound is generated as a result of this alcoholysis. In the subsequent step X2, aminolysis, which is a reaction in which the polycarbamate compound is decomposed by the amine compound XB, occurs, and a polyamine compound that is a target material is generated as a result of this aminolysis.

In the disclosure, as the amine compound XA that is a tertiary amine compound, any known tertiary amine compound can be used, and it is not particularly limited.

As the amine compound XB, any known amine compound can be used, and it is not particularly limited. The amine compound XB is not limited to be a tertiary amine compound.

The amine compound XA and the amine compound XB may be amine compounds of the same kind, or may be amine compounds of different kinds.

The steps that may be included in the method of producing a polyamine compound according to the second embodiment will now be described.

<Step X1>

The step X1 is the step of generating a polycarbamate compound by reacting a thiourethane resin and an alcohol compound with each other in the presence of an amine compound XA that is a tertiary amine compound.

(Thiourethane Resin)

The thiourethane resin used in the step X1 is the same as the thiourethane resin used in the first step of the first embodiment, and preferred ranges of these thiourethane resins are also the same.

The step X1 may also be the step of generating a polycarbamate compound by bringing a resin mixture containing a thiourethane resin and an alcohol compound into contact with each other in the presence of an amine compound XA that is a tertiary amine compound and thereby allowing the thiourethane resin in the resin mixture and the alcohol compound to react with each other in the presence of the amine compound XA.

In this case, a preferred aspect of the resin mixture containing a thiourethane resin is the same as that of the resin mixture containing a thiourethane resin that may be used in the first step of the first embodiment.

—Powder Containing Thiourethane Resin—

In the step X1, it is preferred to bring a powder containing the thiourethane resin (hereinafter, also referred to as "thiourethane resin powder") and an alcohol compound into contact with each other to allow the thiourethane resin in the powder and the alcohol compound to react with each other. By this, the efficiency of the reaction between the thiourethane resin and the alcohol compound can be further improved.

A method of bringing the thiourethane resin powder and the alcohol compound into contact is not particularly limited, and one example thereof is a method of charging the thiourethane resin powder and the alcohol compound (and a reaction solvent if necessary) to a reaction vessel and stirring the charged materials. In this example, the order of charging the thiourethane resin powder and the alcohol compound (and a reaction solvent if necessary) to the reaction vessel is not particularly limited.

The thiourethane resin powder is not particularly limited; however, it is preferably a cut powder (encompassing the concept of ground powder; the same applies hereinafter) of a formed body containing the thiourethane resin and/or the above-described cut powder applied to a sieve (i.e., the cut powder passed through the sieve).

The cut powder of a formed body containing the thiourethane resin is generated, for example, in the process of producing an optical material (e.g., a lens) by cutting the formed body containing the thiourethane resin.

Alternatively, the thiourethane resin powder may be a massive powder obtained by crushing and/or pulverizing a formed body containing the thiourethane resin.

(Alcohol Compound)

In the step X1, the thiourethane resin is reacted with at least one alcohol compound.

The alcohol compound is believed to function as a decomposition agent for the thiourethane resin.

As the alcohol compound in the step X1, any known alcohol compound can be used with no particular limitation.

In the step X1, the alcohol compound (i.e., the alcohol compound reacted with the thiourethane resin) may be used singly, or in combination of two or more thereof.

Further, the alcohol compound used in the step X1 may be a monoalcohol compound containing only one hydroxy group, or a polyol compound containing two or more hydroxy groups.

From the standpoint of further improving the reactivity between the thiourethane resin and the alcohol compound, the molecular weight of the alcohol compound is preferably 1,000 or less, more preferably 500 or less, still more preferably 300 or less, yet still more preferably 200 or less.

A lower limit of the molecular weight of the alcohol compound is, for example, not less than 40, preferably not less than 50, more preferably not less than 60.

The alcohol compound used in the step X1 preferably contains an alcohol compound having a boiling point of from 135° C. to 250° C. (hereinafter, also referred to as "alcohol compound A").

The term "boiling point" used herein means a boiling point under 1 atm (101,325 Pa).

A ratio of the alcohol compound A with respect to a total amount of the alcohol compound used in the step X1 is preferably from 50% by mass to 100% by mass, more preferably from 60% by mass to 100% by mass, still more preferably from 80% by mass to 100% by mass.

The alcohol compound used in the step X1 is preferably benzyl alcohol, phenethyl alcohol, 2-octanol, 2-ethyl-1-hexanol, 1-decanol, 1-nonanol, 1-octanol, 1-heptanol, 1-hexanol, 1-pentanol, propylene glycol, or ethylene glycol, more preferably benzyl alcohol, phenethyl alcohol, l-decanol, 1-nonanol, 1-octanol, 1-heptanol, 1-hexanol, 1-pentanol, propylene glycol, or ethylene glycol, still more preferably benzyl alcohol, phenethyl alcohol, 2-octanol, 1-octanol, 1-heptanol, 1-hexanol, 1-pentanol, or propylene glycol.

A preferred charged amount of the alcohol compound used in the step X1 will now be described.

The below-described preferred charged amount also corresponds to a preferred charged amount of the alcohol compound A (i.e., an alcohol compound having a boiling point of from 150° C. to 250° C.).

—Charged Amount of Alcohol Compound—

In the step X1, a charged mass ratio of the alcohol compound with respect to the thiourethane resin (i.e., charged mass ratio [alcohol compound/thiourethane resin]) can be adjusted as appropriate, and it is preferably from 0.10 to 20.

When the charged mass ratio [alcohol compound/thiourethane resin] is 0.10 or higher, the generation of a polythiol composition is further facilitated.

When the charged mass ratio [alcohol compound/thiourethane resin] is 20 or lower, the alcohol compound can be further prevented from remaining in a reaction mixture.

The charged mass ratio [alcohol compound/thiourethane resin] is more preferably from 0.30 to 15, still more preferably from 0.40 to 10.

In the step X1, the number of charged millimoles of the alcohol compound with respect to 1 g of the thiourethane resin is preferably from 1.0 mmol/g to 100 mmol/g, more preferably from 2.0 mmol/g to 80 mmol/g, still more preferably from 5.0 mmol/g to 60 mmol/g.

In the step X1, a charged equivalent of the alcohol compound with respect to the thiourethane resin (charged equivalent [alcohol compound/thiourethane resin]) is preferably from 1 to 50, more preferably from 2 to 40, still more preferably from 2 to 30.

When the charged equivalent [alcohol compound/thiourethane resin] is 1 or more, the generation of a polythiol composition is further facilitated.

When the charged equivalent [alcohol compound/thiourethane resin] is 50 or less, the alcohol compound can be further prevented from remaining in a reaction mixture.

It is noted here that the charged equivalent of the alcohol compound with respect to the thiourethane resin (charged equivalent [alcohol compound/thiourethane resin]) means a ratio of the number of hydroxy groups in the charged alcohol compound with respect to a total number of thiourethane bonds in the charged thiourethane resin.

(Amine Compound XA)

In the step X1, the thiourethane resin and the alcohol compound are reacted with each other in the presence of an amine compound XA that is a tertiary amine compound.

The amine compound XA is believed to function as a decomposition aid.

The amine compound XA is not particularly limited.

The amine compound XA may be a chain amine compound or a cyclic amine compound.

The amine compound XA has a molecular weight of preferably 1,000 or less, more preferably 500 or less, still more preferably 300 or less, yet still more preferably 200 or less.

A lower limit of the molecular weight of the amine compound XA is, for example, not less than 59, preferably not less than 70.

The amine compound XA is not particularly limited, except for being a tertiary amine compound.

The amine compound XA is:
preferably N,N-dimethylethanolamine, N,N-dimethylaminopropanol, N,N-diethylaminoethanol, N-methyldiethanolamine, diisopropylethylamine, triethylamine, triisopropylamine, triisobutylamine, N,N-dimethylcyclohexylamine, N-methylmorpholine, N-ethylmorpholine, dimethylpiperazine, 1-ethylpiperidine, 4-(2-hydroxyethyl) morpholine, 1,4-diazabicyclo[2,2,2] octane, diazabicyclononene, or diazabicycloundecene;
more preferably N,N-dimethylethanolamine, N,N-diethylaminoethanol, N-methyldiethanolamine, diisopropylethylamine, triisopropylamine, triisobutylamine, N,N-dimethylcyclohexylamine, N-methylmorpholine, N-ethylmorpholine, dimethylpiperazine, 1-ethylpiperidine, 1,4-diazabicyclo[2,2,2]octane, diazabicyclononene, or diazabicycloundecene;
still more preferably N,N-dimethylethanolamine, diisopropylethylamine, N,N-dimethylcyclohexylamine, N-ethylmorpholine, or 1,4-diazabicyclo[2,2,2]octane.

In the step X1, a charged mass ratio of the amine compound XA with respect to the alcohol compound (i.e., charged mass ratio [amine compound XA/alcohol compound]) can be adjusted as appropriate, and it is preferably from 0.001 to 2.00.

The charged mass ratio [amine compound XA/alcohol compound] is more preferably from 0.002 to 1.50, still more preferably from 0.004 to 1.20.

In the step X1, an charged molar ratio of the amine compound XA with respect to the alcohol compound (i.e., charged molar ratio [amine compound XA/alcohol compound]) can be adjusted as appropriate, and it is preferably from 0.001 to 3.00.

The charged molar ratio [amine compound XA/alcohol compound] is more preferably from 0.002 to 2.50, still more preferably from 0.003 to 2.00, yet still more preferably from 0.004 to 1.50, further more preferably from 0.004 to 1.00.

(Reaction Solvent X1)

In the step X1, the thiourethane resin and the alcohol compound may be reacted in the presence of a reaction solvent (hereinafter, also referred to as "reaction solvent X1").

The reaction solvent X1 is preferably a hydrocarbon compound having from 5 to 12 (preferably from 6 to 10, more preferably from 7 to 9) carbon atoms.

The hydrocarbon compound is preferably hexane, heptane, octane, nonane, decane, xylene, mesitylene, or toluene, more preferably heptane, octane, nonane, xylene, mesitylene, or toluene, particularly preferably xylene or toluene.

The hydrocarbon compound as the reaction solvent X1 may be used singly, or in combination of two or more kinds thereof.

(Reaction Temperature X1)

A reaction temperature of the thiourethane resin and the alcohol compound in the step X1 (hereinafter, also referred to as "reaction temperature X1") is adjusted as appropriate.

In the step X1, the thiourethane resin and the alcohol compound are preferably reacted under a temperature condition (i.e., reaction temperature X1) of from 70° C. to 200° C. (more preferably from 90° C. to 180° C., still more preferably from 100° C. to 170° C.).

When the reaction temperature X1 is from 70° C. to 200° C., the purity of a polythiol component as a main component in the polythiol composition as a target material (i.e., the content of the main component with respect to a total amount of the polythiol composition) can be further improved.

Further, in the step X1, the reaction may be performed under a pressurized condition. When the reaction is performed under a pressurized condition, the reaction time may be shortened.

(Reaction Time X1)

A reaction time of the thiourethane resin and the alcohol compound in the step X1 can be adjusted as appropriate, and it is preferably from 0.1 hours to 50 hours, more preferably from 0.5 hours to 30 hours, still more preferably from 1 hour to 20 hours.

(Polycarbamate Compound)

The polycarbamate compound generated in the step X1 is an alcoholysis product of the thiourethane resin, which is generated by a reaction between the thiourethane resin and the alcohol compound (i.e., alcoholysis).

The polycarbamate compound is a compound (i.e., a polyurethane compound) containing two or more carbamate bonds (i.e., urethane bonds).

The polycarbamate compound is, for example, a polycarbamate compound (i.e., polyurethane compound) having a structure in which carbamate bonds (i.e., urethane bonds) are formed by reaction between all of the isocyanato groups in the polyisocyanate compound that is one of the raw materials of the thiourethane resin and the hydroxy group of the alcohol compound. In the disclosure, a polycarbamate compound having this structure may be referred to as "carbamate body" formed of a polyamine compound (e.g., XDA) corresponding to the polyisocyanate compound that is one of the raw materials (e.g., XDI) and the alcohol compound (e.g., 1-octanol). It is noted here that the "polyamine compound corresponding to the polyisocyanate compound" means a compound obtained by substituting all of the isocyanato groups in the polyisocyanate compound with amino groups. The polyamine compound corresponding to the polyisocyanate compound is a target material in the method of producing a polyamine compound according to the second embodiment.

(Reaction Step X1 and Separation Step X2)

The step X1 may include:
- a reaction step of reacting the thiourethane resin and the alcohol compound with each other to obtain a reaction mixture that contains a polycarbamate-containing mixture containing a polycarbamate compound; and
- a separation step of separating the polycarbamate-containing mixture from the reaction mixture.

In this case, in the below-described step X2, the polycarbamate-containing mixture separated in the above-described separation step and an amine compound XB are mixed with each other to allow the polycarbamate compound in the polycarbamate-containing mixture and the amine compound XB to react with each other.

The term "polycarbamate-containing mixture" used herein means a mixture of two or more kinds of carbamate compounds, including a polycarbamate compound.

Hereinafter, the above-described reaction mixture, reaction step, and separation step are also referred to as "reaction mixture X1", "reaction step X1", and "separation step X2", respectively.

Preferred conditions of the reaction step X1 are as described above.

The reaction mixture generated in the reaction step X1 may also contain the polycarbamate-containing mixture that is a main product generated by alcoholysis, and components other than the polycarbamate-containing mixture.

Examples of such other components include by-products generated by alcoholysis (e.g., a polythiol composition), the above-described reaction solvent, residue of the raw material(s) (thiourethane resin and/or alcohol compound), and impurities contained in the raw materials.

With regard to a preferred aspect of the polythiol composition generated as a by-product, reference can be made as appropriate to the above-described preferred aspect of the polythiol composition as a raw material of the thiourethane resin.

The polythiol composition generated as a by-product by alcoholysis reaction can be utilized as a raw material for production of a new thiourethane resin. By this, effective utilization (i.e., recycle) of the material is realized.

A separation method in the separation step X2 is not particularly limited, and any known method can be applied.

Examples of the separation method in the separation step X2 include filtration, decantation, extraction, distillation, drying (including vacuum drying), and purification (e.g., column chromatography). These separation methods may be used in combination of two or more thereof.

One example of a preferred aspect of the separation step X2 is an aspect (hereinafter, referred to as "separation aspect X1") in which the separation step X2 includes:
- filtering the reaction mixture X1 to obtain a filtrate;
- washing the filtrate with an acid and then with water;
- adding an alkali metal-containing base to the thus water-washed filtrate and subsequently washing this filtrate with water to remove salts (e.g., an alkali metal salt of a polythiol composition that is a reaction by-product); and
- separating a poly carbamate-containing mixture from the filtrate from which salts have been removed.

In the separation aspect X1, first, the filtrate is washed with an acid (hereinafter, also referred to as "acid washing"), and thereby, amines (e.g., tertiary amine compound) are removed from the filtrate. Examples of the acid used in this acid washing include hydrochloric acid, carbonic acid, nitric acid, sulfuric acid, acetic acid, formic acid, and oxalic acid.

Next, the thus acid-washed filtrate is washed with water to remove the acid from the filtrate. At this stage after the removal of the acid, the filtrate contains a polycarbamate-containing mixture that is a target material, and it is believed that the filtrate also contains a polythiol composition, which is a by-product, in addition to the polycarbamate-containing mixture.

In the separation aspect X1, an alkali metal-containing base is added to the thus water-washed filtrate. By this, the polythiol composition in the filtrate is converted to an alkali metal salt. The filtrate is subsequently washed with water to remove the alkali metal salt of the polythiol composition from the filtrate.

In the separation aspect X1, from this filtrate from which the alkali metal salt of the polythiol composition has been removed, a polycarbamate-containing mixture is separated by a known method.

In the separation aspect X1, the alkali metal in the alkali metal-containing base is preferably sodium, potassium, or lithium, more preferably sodium or potassium.

Examples of the alkali metal-containing base include sodium methoxide, sodium ethoxide, sodium propoxide, sodium hydroxide, potassium hydroxide, and lithium hydroxide.

If necessary, the alkali metal-containing base can be added to the filtrate in the form of an alcohol solution (e.g., a methanol solution or an ethanol solution).

Further, in the separation aspect X1, prior to the acid washing of the filtrate obtained by filtration of the reaction mixture X1, a solvent (hereinafter, also referred to as "separation solvent X1") may be added to the filtrate, and this filtrate to which the separation solvent X1 has been added may be sequentially washed with an acid and water.

As the separation solvent X1, the same solvent as the reaction solvent may be used, or an alcohol solvent may be used.

When the reaction solvent is used in the reaction step X1, the addition of the separation solvent X1 to the filtrate may be omitted.

<Step X2>

The step X2 is the step of generating a polyamine compound as a target material by reacting the polycarbamate compound generated in the step X1 and an amine compound XB with each other.

In the step X2, the polycarbamate-containing mixture separated in the above-described separation step X2 and the amine compound XB may be mixed with each other to allow the polycarbamate compound in the polycarbamate-containing mixture and the amine compound XB to react with each other.

The reaction in the step X2 (aminolysis) has a higher polyamine compound generation efficiency as compared to a known reaction in which a polyamine compound is obtained by a reaction between a polycarbamate compound and sodium hydroxide (see, for example, the below-described Comparative Example 1). As a result, the amount of the polyamine compound generated can be increased as compared to a case where the above-described known reaction is applied. This effect can be verified by analyzing a reaction mixture obtained in the step X2 by gas chromatography (GC).

(Amine Compound XB)

As the amine compound XB in the step X2, any known amine compound can be used with no particular limitation.

In the step X2, the amine compound XB may be used singly, or in combination of two or more kinds thereof.

The amine compound XA and the amine compound XB may be the same or different.

One preferred aspect of the amine compound XB is an aspect in which the amine compound XB is an amine compound of 300 or less in molecular weight, which contains at least one of an amino group or a monoalkylamino group, and has a total number of amino groups and monoalkylamino groups of 1 or 2.

From the standpoint of the reactivity with the polycarbamate compound, the amine compound XB preferably contains an amino group.

From the standpoint of enabling to further increase a reaction temperature X2, the amine compound XB is preferably an amine compound having a boiling point of 100° C. or higher.

From the standpoint of the ease of removal by distillation after the reaction, the amine compound XB is preferably an amine compound having a boiling point of 200° C. or lower.

From the standpoint of the volumetric efficiency, the amine compound XB is preferably an amine compound having a molecular weight of 200 or less (more preferably 150 or less).

Specific examples of the amine compound XB include benzylamine, monoethanolamine, hexylamine, heptylamine, octylamine, aminopropanol, propylenediamine, 1,3-propanediamine, diethylenetriamine, triethylenetetramine, tetraethylenepentamine, aminoethylethanolamine, and polyethylene imine.

The amine compound XB is preferably 1,3-propanediamine, diethylenetriamine, aminoethylethanolamine, benzylamine, or monoethanolamine, particularly preferably monoethanolamine, diethylenetriamine, or aminoethylethanolamine.

In the step X2, a charged equivalent of the amine compound XB with respect to the polycarbamate compound (charged equivalent [amine compound XB/poly carbamate compound]) is preferably from 1.0 to 50, more preferably from 1.5 to 45, still more preferably from 2.0 to 45, yet still more preferably from 2.5 to 40.

When the charged equivalent [amine compound XB/poly carbamate compound] is 1.0 or more, the generation of a polyamine compound is further facilitated.

When the charged equivalent [amine compound XB/polycarbamate compound] is 50 or less, there is an advantage in terms of reducing the amount of the amine compound XB to be used.

It is noted here that the charged equivalent of the amine compound XB with respect to the polycarbamate compound (charged equivalent [amine compound XB/polycarbamate compound]) means a ratio of a total number of amino groups and monoalkylamino groups in the charged amine compound XB with respect to a total number of carbamate bonds (i.e., urethane bonds) in the charged polycarbamate compound.

In the step X2, when the polycarbamate-containing mixture separated in the above-described separation step X1 and the amine compound XB are mixed with each other to allow the polycarbamate compound in the polycarbamate-containing mixture and the amine compound XB to react with each other, the charged equivalent [amine compound XB/polycarbamate compound] may be determined based on an assumption that the whole amount of the polycarbamate-containing mixture is the polycarbamate compound.

In the step X2, the polycarbamate compound and the amine compound XB can be reacted with each other in the absence of a reaction solvent. For example, the polycarbamate-containing mixture containing the polycarbamate compound and the amine compound XB may be directly mixed in the absence of a reaction solvent to allow the polycarbamate compound and the amine compound XB to react in the absence of a reaction solvent.

However, in the step X2, the polycarbamate compound and the amine compound XB may be reacted in the presence of a reaction solvent.

When the polycarbamate compound and the amine compound XB are reacted in the step X2, it may be preferable to allow an inorganic base to coexist with the polycarbamate compound and the amine compound XB. In this case, a reaction by-product of the above-described reaction (e.g., a cyclic urea compound such as an imidazolidinone compound) reacts with the inorganic base, and the reaction by-product can thereby be decomposed into the amine compound XB and a carbonate. As a result, the amine compound XB can be collected.

This effect can be expected not only when the polycarbamate compound, the amine compound XB, and the inorganic base are simultaneously added and reacted, but also when the inorganic base is added to and reacted with a reaction mixture obtained by a reaction between the polycarbamate compound and the amine compound XB.

Further, the above-described effect is more effectively exerted when the amine compound XB contains at least one of an amino group or a monoalkylamino group and has a total number of amino groups and monoalkylamino groups of 2 or more.

Specific examples of the inorganic base include sodium hydroxide, potassium hydroxide, and lithium hydroxide.

Moreover, a point that the amine compound XB contains at least one of an amino group or a monoalkylamino group and has a total number of amino groups and monoalkylamino groups of 2 or more is also advantageous for the inhibition of reverse reaction.

In the step X2, when the inorganic base is allowed to coexist in addition to the polycarbamate compound and the amine compound XB, a charged equivalent of the inorganic base (charged equivalent [inorganic base/polycarbamate compound]) is preferably from 0.5 to 5, more preferably from 1 to 4, still more preferably from 1.5 to 3.

When the charged equivalent [inorganic base/polycarbamate compound] is 0.5 or more, the generation of the amine compound XB from a reaction by-product is further facilitated.

When the charged equivalent [inorganic base/polycarbamate compound] is 5 or less, there is an advantage in terms of reducing the amount of the inorganic base to be used.

It is noted here that the charged equivalent of the inorganic base with respect to the poly carbamate compound (charged equivalent [inorganic base/poly carbamate compound]) means a ratio of a total number of inorganic bases with respect to a total number of urethane bonds in the charged polycarbamate compound.

In the step X2, when the polycarbamate-containing mixture separated in the above-described separation step X2 and the inorganic base are mixed with each other to allow the polycarbamate compound in the polycarbamate-containing mixture and the inorganic base to react with each other, the charged equivalent [inorganic base/polycarbamate compound] may be determined based on an assumption that the whole amount of the polycarbamate-containing mixture is the polycarbamate compound.

(Reaction Temperature X2)

A reaction temperature of the polycarbamate compound and the amine compound XB in the step X2 (hereinafter, also referred to as "reaction temperature X2") is adjusted as appropriate.

In the step X2, the polycarbamate compound and the amine compound XB are preferably reacted with each other under a temperature condition (i.e., reaction temperature X2) of from 80° C. to 180° C. (more preferably from 90° C. to 180° C., still more preferably from 100° C. to 180° C., yet still more preferably from 110° C. to 170° C., further more preferably from 120° C. to 160° C.).

Further, in the step X2, the reaction may be performed under a pressurized condition. When the reaction is performed under a pressurized condition, the reaction time may be shortened.

(Reaction Time X2)

A reaction time of the polycarbamate compound and the amine compound XB in the step X2 can be adjusted as appropriate, and it is preferably from 0.1 hours to 40 hours, more preferably from 0.5 hours to 20 hours, still more preferably from 1 hour to 10 hours.

(Reaction Step X2 and Separation Step X2)

The step X2 may include:
 a reaction step of reacting the poly carbamate compound and the amine compound XB with each other to obtain a reaction mixture containing a polyamine compound; and
 a separation step of separating the polyamine compound from the reaction mixture.

Hereinafter, the above-described reaction mixture, reaction step, and separation step are also referred to as "reaction mixture X2", "reaction step X2", and "separation step X2", respectively.

A preferred aspect of the reaction in the reaction step X2 is as described above.

A separation method in the separation step X2 is not particularly limited, and any known method can be applied.

Examples of the separation method in the separation step X2 include filtration, decantation, washing, extraction, distillation, decompression (e.g., vacuuming), and purification (e.g., column chromatography). These separation methods may be used in combination of two or more thereof.

One example of a preferred aspect of the separation step X2 is an aspect (hereinafter, referred to as "separation aspect X2") in which the separation step X2 includes:
 extracting the polyamine compound from the reaction mixture X2 using extraction solvent X2 to obtain an extract; and
 separating the polyamine compound from the extract.

In the separation aspect X2, the polyamine compound is not directly separated from the reaction mixture X2, but is rather separated from an extract obtained by extracting the polyamine compound from the reaction mixture X2. By this, the isolated yield of the polyamine compound eventually obtained is further improved. The reason for this is not clear; however, it is believed to be because disproportionation (particularly a reaction in which the polyamine compound is converted back to the polycarbamate compound) in the separation step X2 is further inhibited.

Examples of the extraction solvent X2 in the separation aspect X2 include hydrocarbon compounds.

For example, when a hydrocarbon compound is used as the extraction solvent X2, a preferred aspect of the hydrocarbon compound as the extraction solvent X2 is, for example, the above-described preferred aspect of the hydrocarbon compound used as the reaction solvent X1. However, in this case, the hydrocarbon compound used as the extraction solvent X2 may be the same as or different from the hydrocarbon compound used as the reaction solvent X1.

The operation of separating the polyamine compound from an extract in the separation aspect X2 preferably includes distillation.

Another example of a preferred aspect of the separation step X2 is an aspect in which the separation step X2 includes separating the polyamine compound from the reaction mixture X2 by a distillation method.

For example, as described above, when the amine compound XB contains at least one of an amino group or a monoalkylamino group and has a total number of amino groups and monoalkylamino groups of 2 or more, a by-product of the reaction in the step X2 may be a cyclic urea compound having excellent stability. In this case, a reaction between the polyamine compound that is a target material and the reaction by-product (i.e., cyclic urea compound) is inhibited; therefore, the separation of the polyamine compound by a distillation method can be performed more easily When the polyamine compound is separated from the reaction mixture X2 by a distillation method, insoluble components may be removed from the reaction mixture X2 by filtration, and the polyamine compound may be subsequently separated by a distillation method from the reaction mixture X2 from which insoluble components have been removed.

When insoluble components are removed from the reaction mixture X2 by filtration, the reaction mixture X2 may be diluted prior to the filtration, and the thus diluted reaction mixture X2 may be filtered.

(Polyamine Compound as Target Material)

In the method of producing a polyamine compound according to the second embodiment, the polyamine compound as a target material is an aminolysis product of the thiourethane resin, which is generated by a reaction between the polycarbamate compound and the amine compound XB (i.e., aminolysis).

The polyamine compound as a target material is preferably a polyamine compound corresponding to the polyisocyanate compound used as a raw material of the thiourethane resin that is a starting material in the step X1 (particularly the polyisocyanate compound in which isocyanato groups are substituted with amino groups).

A preferred aspect and a preferred use of the polyamine compound obtained as a target material in the second embodiment are the same as the preferred aspect and the preferred use of the polyamine compound obtained as a target material in the first embodiment, respectively.

<Classification Step>

The method of producing a polyamine compound according to the second embodiment may further include, prior to the step X1, a classification step of classifying a cut powder containing the thiourethane resin to obtain a powder containing the thiourethane resin (i.e., the cut powder whose average particle size has been reduced), the powder having a smaller average particle size (e.g., number-average value of the equivalent circle diameter) than the cut powder. In this case, in the step X1, the powder obtained in the classification step and the alcohol compound are brought into contact with each other to allow the thiourethane resin in the powder and the alcohol compound to react with each other.

When the method of producing a polyamine compound according to the second embodiment includes this classification step, since the powder consisting of particles having a small particle size (i.e., average particle size) and the alcohol compound are brought into contact with each other in the step X1, the efficiency of the reaction between the thiourethane resin and the alcohol compound can be further improved.

The "average particle size" in the disclosure is, for example, a number-average particle size.

The "particle size" is, for example, equivalent circle diameter.

Examples of a classification method include sieving and centrifugation.

With regard to an aspect in which classification is performed by sieving, reference can be made to the below-described sieving step.

<Sieving Step>

The method of producing a polyamine compound according to the second embodiment may further include, prior to the step X1, the sieving step of applying a cut powder containing the thiourethane resin to a sieve to obtain a powder comprising the thiourethane resin, which has passed through the sieve (i.e., the cut powder passed through the sieve). In this case, in the step X1, the powder obtained in the sieving step and the alcohol compound are brought into contact with each other to allow the thiourethane resin in the powder and the alcohol compound to react with each other.

When the method of producing a polyamine compound according to the second embodiment includes this sieving step, since the powder consisting of particles having a small particle size and the alcohol compound are brought into contact with each other in the step X1, the reaction between the thiourethane resin and the alcohol compound (i.e., polycarbamate compound generation reaction) can be further facilitated. As a result, the amount of the polyamine compound generated as a final target material can be further increased.

The above-described sieve is not particularly limited.

The nominal mesh size of the sieve, which is defined by JIS Z-8801-1:2019, is, for example, from 0.1 mm to 20 mm, preferably from 0.1 mm to 10 mm, more preferably from 0.1 mm to 5 mm, still more preferably from 0.1 mm to 2 mm, yet still more preferably from 0.3 mm to 2 mm, further more preferably from 0.5 mm to 1.5 mm.

<Washing Step>

The method of producing a polyamine compound according to the second embodiment may further include, prior to the step X1, a washing step of washing the thiourethane resin powder (i.e., powder containing the thiourethane resin) using a hydrocarbon compound having from 5 to 12 carbon atoms as a washing solvent. In this case, in the step X1, the thiourethane resin in the thiourethane resin powder washed in the washing step and the alcohol compound are allowed to react with each other. By this, the reaction between the thiourethane resin and the alcohol compound (i.e., poly carbamate compound generation reaction) can be further facilitated. As a result, the amount of the polyamine compound generated as a final target material can be further increased.

Particularly, in the method of producing a polyamine compound according to the second embodiment, when a cut powder containing the thiourethane resin is used as a starting material, an oil adhering to the cut powder, which is originated from a cutting machine, can be effectively removed by the washing step; therefore, the above-described effects are exerted more effectively.

The hydrocarbon compound as the washing solvent may be used singly, or in combination of two or more kinds thereof.

A preferred aspect of the hydrocarbon compound used as the washing solvent is the same as that of the hydrocarbon compound used as the above-described reaction solvent X1.

It is noted here, however, that the reaction solvent X1 and the washing solvent may be the same or different.

A washing method in the washing step is not particularly limited, and any known method, such as a method of adding the above-described washing solvent to the thiourethane resin powder and mixing the resultant, can be applied.

When the method of producing a polyamine compound according to the second embodiment includes the above-described sieving step and washing step, the sieving step and the washing step are preferably performed in this order. In this case, since it is not necessary to wash the cut powder not passing through the sieve, the amount of the washing solvent to be used can be further reduced.

[Method of Producing Polyisocyanate Compound]

The method of producing a polyisocyanate compound according to the second embodiment of the disclosure includes:

the step of producing a polyamine compound by the above-described method of producing a polyamine compound according to the second embodiment; and the step of obtaining a polyisocyanate compound by using at least one of the polyamine compound or a hydrochloride of the polyamine compound as at least a portion of a raw material.

According to the method of producing a polyisocyanate compound according to the second embodiment, a polyisocyanate compound can be obtained as a target material using a thiourethane resin as a starting material; therefore, effective utilization of materials (the thiourethane resin and the polyisocyanate compound that is a raw material of the thiourethane resin) is realized.

In the method of producing a polyisocyanate compound according to the second embodiment, at least one of a polyamine compound produced by the method of producing a polyamine compound according to the second embodiment (hereinafter, also referred to as "collected polyamine compound") or a hydrochloride of the collected polyamine compound is used as at least a portion of a raw material in the step of obtaining a polyisocyanate compound.

For example, in the method of producing a polyisocyanate compound according to the second embodiment:

a polyisocyanate compound may be produced by using, as a raw material, only at least one of the collected polyamine compound or a hydrochloride thereof; or a polyisocyanate compound may be produced by using, as a raw material, a combination of at least one of the collected polyamine compound or a hydrochloride thereof, and at least one of a polyamine compound other than the collected polyamine compound or a hydrochloride thereof.

The use of the polyisocyanate compound produced by the method of producing a polyisocyanate compound according to the second embodiment is not particularly limited, and the polyisocyanate compound can be applied to various uses.

The polyisocyanate compound can be used for, for example, production of a thiourethane resin or a urethane resin.

One example of specific use of the polyisocyanate compound that is a target material in the second embodiment is the use for production of an optical material (e.g., a lens).

In other words, one specific example of the method of producing a polyisocyanate compound according to the second embodiment is a method of producing a polyisocyanate compound for production of an optical material. In this specific example, when a cut powder containing a thiourethane resin, which is generated in production of an optical material, is used as a starting material, effective utilization (i.e., recycle) of materials (the thiourethane resin and the polyisocyanate compound) is realized effectively.

In the second embodiment, the step of obtaining a polyisocyanate compound preferably includes reacting at least one of a polyamine compound (i.e., a collected polyamine compound and/or a polyamine compound other than the collected polyamine compound) or a hydrochloride of the polyamine compound (i.e., the collected polyamine compound and/or the polyamine compound other than the collected polyamine compound) and carbonyl dichloride with each other to obtain a polyisocyanate compound.

In this reaction, the amino groups in the polyamine compound and/or the ammonium chloride groups in the hydrochloride of the polyamine compound are converted into isocyanato groups, whereby a polyisocyanate compound can be obtained.

This reaction itself is known, and reference can be made as appropriate to a known method of producing a polyisocyanate compound.

[Method of Producing Polymerizable Composition]

The method of producing a polymerizable composition according to the second embodiment of the disclosure includes:

the step of producing a polyisocyanate compound by the above-described method of producing a polyisocyanate compound according to the second embodiment; and the step of obtaining a polymerizable composition containing the polyisocyanate compound and an active hydrogen compound by mixing at least the polyisocyanate compound and the active hydrogen compound.

The method of producing a polymerizable composition according to the second embodiment, if necessary, may also include other steps.

In the method of producing a polymerizable composition according to the second embodiment:

in the step of producing a polyisocyanate compound, a polyisocyanate compound is produced using a thiourethane resin (e.g., a thiourethane resin contained in a ground powder of a formed body of the thiourethane resin) as a starting material; and in the step of obtaining a polymerizable composition, a polymerizable composition containing the thus produced polyisocyanate compound and an active hydrogen compound is produced.

The thus obtained polymerizable composition can be used again for production of a thiourethane resin.

In this manner, in the method of producing a polymerizable composition according to the disclosure, effective utilization (i.e., recycle) of materials (i.e., a thiourethane resin and a polyisocyanate compound that is a raw material of the thiourethane resin) is realized.

In the method of producing a polymerizable composition according to the second embodiment, a polyisocyanate compound is produced by the method of producing a polyisocyanate compound according to the second embodiment in the step of producing a polyisocyanate compound.

Meanwhile, in the above-described method of producing a polymerizable composition according to the first embodiment, a polyisocyanate compound is produced by the method of producing a polyisocyanate compound according to the first embodiment in the step of producing a polyisocyanate compound.

Except for this point, the method of producing a polymerizable composition according to the second embodiment is the same as the method of producing a polymerizable composition according to the first embodiment, and preferred aspects of these methods are also the same.

[Method of Producing Resin]

The method of producing a resin according to the second embodiment of the disclosure includes:

the step of producing a polymerizable composition by the above-described method of producing a polymerizable composition according to the second embodiment; and the step of obtaining a resin by curing the polymerizable composition.

The method of producing a resin according to the second embodiment, if necessary, may also include other steps.

According to the method of producing a resin according to the second embodiment, the same effects as those of the above-described method of producing a polymerizable composition according to the disclosure are exerted.

In the method of producing a resin according to the second embodiment, a polymerizable composition is produced by the method of producing a polymerizable composition according to the second embodiment in the step of producing a polymerizable composition.

Meanwhile, in the method of producing a resin according to the first embodiment, a polymerizable composition is produced by the method of producing a polymerizable composition according to the first embodiment in the step of producing a polymerizable composition.

Except for this point, the method of producing a resin according to the second embodiment is the same as the method of producing a resin according to the first embodiment, and preferred aspects of these methods are also the same.

[Method of Producing Formed Body]

The method of producing a formed body according to the second embodiment of the disclosure is a method of producing a resin-containing formed body, and includes:

the step of producing a polymerizable composition by the above-described method of producing a polymerizable composition according to the second embodiment; and the step of obtaining a resin-containing formed body by curing the polymerizable composition.

The method of producing a formed body according to the disclosure, if necessary, may also include other steps.

According to the method of producing a formed body according to the second embodiment, the same effects as those of the above-described method of producing a polymerizable composition according to the second embodiment are exerted.

In the method of producing a formed body according to the second embodiment, a polymerizable composition is produced by the method of producing a polymerizable composition according to the second embodiment in the step of producing a polymerizable composition.

Meanwhile, in the method of producing a formed body according to the first embodiment, a polymerizable composition is produced by the method of producing a polymerizable composition according to the first embodiment in the step of producing a polymerizable composition.

Except for this point, the method of producing a formed body according to the second embodiment is the same as the method of producing a formed body according to the first embodiment, and preferred aspects of these methods are also the same.

Preferred performance (e.g., glass transition temperature Tg, refractive index (ne), Abbe number (ve), and specific gravity d) of the resin (or formed body) according to the second embodiment are the same as the above-described preferred performance of the resin (or formed body) according to the first embodiment.

[Method of Producing Optical Material and Method of Producing Lens]

The method of producing an optical material (e.g., a lens) according to the second embodiment of the disclosure is a method of producing an optical material (e.g., a lens) containing a resin-containing formed body, and includes:

the step of producing a polymerizable composition by the above-described method of producing a polymerizable composition according to the second embodiment; and the step of obtaining a resin-containing formed body by curing the polymerizable composition.

The method of producing an optical material (e.g., a lens; the same applies hereinafter) according to the second embodiment, if necessary, may also include other steps.

According to the method of producing an optical material according to the second embodiment, the same effects as those of the above-described method of producing a polymerizable composition according to the second embodiment are exerted.

In the method of producing an optical material according to the second embodiment, a polymerizable composition is produced by the method of producing a polymerizable composition according to the second embodiment in the step of producing a polymerizable composition.

Meanwhile, in the method of producing an optical material according to the first embodiment, a polymerizable composition is produced by the method of producing a polymerizable composition according to the first embodiment in the step of producing a polymerizable composition.

Except for this point, the method of producing an optical material according to the second embodiment is the same as the method of producing an optical material according to the first embodiment, and preferred aspects of these methods are also the same.

Preferred aspects (e.g., use) of the optical material obtained by the method of producing an optical material according to the second embodiment is also the same as those of the optical material obtained by the method of producing an optical material according to the second embodiment.

EXAMPLES

Examples of the disclosure will now be described; however, the disclosure is not limited to the below-described Examples.

Unless otherwise specified, the term "room temperature" used herein means 25° C.

Hereinafter, the purity (%) of a polythiol component A1 in a polythiol composition means the content (%) of the polythiol component A1 with respect to a total amount of the polythiol composition, more specifically the ratio (% by area) of a peak total area of the polythiol component A1 with respect to a total area of all peaks of the polythiol composition, which ratio is determined by high-performance liquid chromatography under the following conditions.

(Conditions of High-Performance Liquid Chromatography)
Column: YMC-Pack ODS-A (particle size S: 5 μm, pore diameter: 12 nm, column shape: @6 mm×150 mm)
Mobile phase: acetonitrile/0.01-mol aqueous potassium dihydrogen phosphate solution=60/40 (vol/vol)
Column temperature: 40° C.
Flow rate: 1.0 ml/min
Detector: UV detector, wavelength: 230 nm
Preparation of measurement solution: 160 mg of a sample is dissolved and mixed with 10 ml of acetonitrile.
Injection amount: 2 μL Hereinafter, the purity (% by mass) of a polythiol component A2 in a polythiol composition means the content (% by mass) of the polythiol component A2 with respect to a total amount of the polythiol composition, more specifically the content (% by mass) of the polythiol component A2 with respect to a total amount of the polythiol composition, which content is determined by high-performance liquid chromatography under the following conditions using an internal standard substance.

(Conditions of High-Performance Liquid Chromatography)
Column: YMC-Pack ODS-A (particle size S: 5 μm, pore diameter: 12 nm, column shape: @6 mm×150 mm)
Mobile phase: acetonitrile/0.01 M aqueous potassium dihydrogen phosphate solution=60/40 (vol/vol)
Column temperature: 40° C.
Flow rate: 1.0 mL/min
Detector: UV detector, wavelength: 230 nm
Preparation of measurement solution: 150 mg of an internal standard substance (1,2,4-trimethylbenzene) and 160 mg of a sample are dissolved and mixed with 5 mL of acetonitrile
Injection amount: 1 μL Reference Production Example 1

(Production of Formed body Containing Thiourethane Resin R1)

In a flask equipped with a stirrer, dimethyl tin dichloride (trade name: NESTIN-P, manufactured by The Honjo Chemical Corporation) (100 ppm by mass with respect to a total amount of the polymerizable composition to be obtained) as a polymerization catalyst, ZELEC-UN (manufactured by Stepan Company; acidic phosphoric acid ester) (1,000 ppm by mass with respect to a total amount of the polymerizable composition to be obtained) as a mold release agent, m-xylylene diisocyanate (XDI) (50.8 parts by mass) as a polyisocyanate compound, and a polythiol composition X1 (49.2 parts by mass) containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component were added and mixed with stirring for 1 hour at room temperature to obtain a polymerizable composition in the form of a transparent homogeneous solution.

It is noted here that the purity of the polythiol component A1 in the polythiol composition X1 (i.e., the content of the polythiol component A1 with respect to a total amount of the polythiol composition X1) was 85.5%.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then this pair of glass molds was placed in an oven, after which the oven internal temperature was set at 25° C. Subsequently, the oven internal temperature was raised from 25° C. to 120° C. over a period of 24 hours. By this process, monomers (the polyisocyanate compound and the polythiol composition) contained in the degassed polymerizable composition were polymerized to form a formed body containing a thiourethane resin R1 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.

(Production of Thiourethane Resin Powder R1)

A lens was produced by cutting the thus obtained formed body. A cut powder generated in this process was collected and applied to a sieve having a nominal mesh size of 1 mm as defined by JIS Z-8801-1:2019, whereby a thiourethane resin powder R1 passed through the sieve (i.e., powder containing the thiourethane resin R1) was obtained.

(Washing of Thiourethane Resin Powder R1: Washing Step)

The thus obtained thiourethane resin powder R1 (30 g) was weighed. A washing operation consisting of adding 150 g of toluene to this thiourethane resin powder R1 (30 g), stirring the resultant, and then removing toluene by filtration was performed three times. The thiourethane resin powder R1 thus subjected to the washing operation three times was transferred to a magnetic dish and dried to obtain a washed resin powder R1.

Reference Production Example 2

(Production of Formed body Containing Thiourethane Resin R2)

In a flask equipped with a stirrer, dibutyl tin dichloride (100 ppm by mass with respect to a total amount of the polymerizable composition to be obtained) as a polymerization catalyst, ZELEC-UN (manufactured by Stepan Company; acidic phosphoric acid ester) (1,000 ppm by mass with respect to a total amount of the polymerizable composition to be obtained) as a mold release agent, m-xylylene diisocyanate (XDI) (52 parts by mass) as a polyisocyanate compound, and a polythiol composition X2 (48 parts by mass) containing 4-mercaptomethyl-1,8-dimercapto-3,6-dithiaoctane (i.e., polythiol component A2) as a main component were added and mixed with stirring for 1 hour at room temperature (25° C.) to obtain a polymerizable composition in the form of a transparent homogeneous solution.

It is noted here that the purity of the polythiol component A2 in the polythiol composition X2 (i.e., the content of the polythiol component A1 with respect to a total amount of the polythiol composition X2) was 92.2%.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then this pair of glass molds was placed in an oven, after which the oven internal temperature was set at 10° C. Subsequently, the oven internal temperature was raised from 10° C. to 120° C. over a period of 38 hours. By this process, monomers (the polyisocyanate compound and the polythiol composition) contained in the degassed polymerizable composition were polymerized to form a formed body containing a thiourethane resin R2 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.

(Production and Washing of Thiourethane Resin Powder R2)

A lens was produced by cutting the thus obtained formed body. A cut powder generated in this process was collected to obtain a thiourethane resin powder R2.

Reference Production Example 3

(Production of Formed body Containing Thiourethane Resin R3)

In a flask equipped with a stirrer, dibutyl tin dichloride (600 ppm by mass with respect to a total amount of the polymerizable composition to be obtained) as a polymerization catalyst, ZELEC-UN (manufactured by Stepan Company; acidic phosphoric acid ester) (1,200 ppm by mass with respect to a total amount of the polymerizable composition to be obtained) as a mold release agent, an isocyanate composition (NBDI) (50.6 parts by mass) containing 2,5-bis(isocyanatomethyl) bicyclo-[2.2.1]-heptane and 2,6-bis (isocyanatomethyl) bicyclo-[2.2.1]-heptane as main components, a polythiol composition X2 (25.6 parts by mass) containing 4-mercaptomethyl-1,8-dimercapto-3,6-dithiaoctane (i.e., polythiol component A2) as a main component, and a polythiol composition X3 (23.9 parts by mass) containing pentaerythritol tetrakis(3-mercaptopropionate) (i.e., polythiol component A3) as a main component were added and mixed with stirring for 1 hour at room temperature (25° C.) to obtain a polymerizable composition in the form of a transparent homogeneous solution.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then this pair of glass molds was placed in an oven, after which the oven internal temperature was set at 10° C. Subsequently, the oven internal temperature was raised from 10° C. to 120° C. over a period of 38 hours. By this process, monomers (the polyisocyanate compound and the polythiol compositions) contained in the degassed polymerizable composition were polymerized to form a formed body containing a thiourethane resin R3 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds, (Production and Washing of Thiourethane Resin Powder R3)

A lens was produced by cutting the thus obtained formed body. A cut powder generated in this process was collected to obtain a thiourethane resin powder R3.

Reference Production Example 4

(Production of Formed body Containing Thiourethane Resin R4)

In a flask equipped with a stirrer, dibutyl tin dichloride (600 ppm by mass with respect to a total amount of the polymerizable composition to be obtained) as a polymerization catalyst, ZELEC-UN (manufactured by Stepan Company; acidic phosphoric acid ester) (1,200 ppm by mass with respect to a total amount of the polymerizable composition to be obtained) as a mold release agent, an isocyanate composition (NBDI) (54.3 parts by mass) containing 2,5-bis(isocyanatomethyl) bicyclo-[2.2.1]-heptane and 2,6-bis (isocyanatomethyl) bicyclo-[2.2.1]-heptane as main components, and a polythiol composition X2 (45.7 parts by mass)

containing 4-mercaptomethyl-1,8-dimercapto-3,6-dithiaoctane (i.e., polythiol component A2) as a main component were added and mixed with stirring for 1 hour at room temperature (25° C.) to obtain a polymerizable composition in the form of a transparent homogeneous solution.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then this pair of glass molds was placed in an oven, after which the oven internal temperature was set at 10° C. Subsequently, the oven internal temperature was raised from 10° C. to 120° C. over a period of 38 hours. By this process, monomers (the polyisocyanate compound and the polythiol composition) contained in the degassed polymerizable composition were polymerized to form a formed body containing a thiourethane resin R4 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.
(Production and Washing of Thiourethane Resin Powder R4)

A lens was produced by cutting the thus obtained formed body. A cut powder generated in this process was collected to obtain a thiourethane resin powder R4.

Example 1

(First Step: Decomposition of Thiourethane Resin R1 by Monoethanolamine)

The washed resin powder R1 (30 g) obtained in Reference Production Example 1 was charged into a 500 mL flask equipped with a condenser, and 14.8 g (0.24 mol) of monoethanolamine (MEA) (manufactured by FUJIFILM Wako Pure Chemical Corporation) as an amine compound A and 361 g of toluene were added thereto, followed by heating with stirring at 100° C. for 3 hours, whereby a first reaction mixture was obtained (the above operations are hereinafter referred to as "first reaction step")

The thus obtained first reaction mixture was cooled to 30° C., and solid (filtration residue) was separated by filtration. The thus separated solid (filtration residue) was left to stand at room temperature and thereby dried to obtain 28.0 g of a mixture (hereinafter, also referred to as "polyurea-containing mixture P1") containing, as a main component, a urea body (polyurea compound) of m-xylylenediamine (hereinafter, also referred to as "XDA") and MEA (the above operations are hereinafter referred to as "first separation step").
(Second Step: Decomposition of Urea Body by Monoethanolamine)

In a 100 mL flask equipped with a condenser, the polyurea-containing mixture P1 (10.0 g) obtained in the first step was weighed, and 39.1 g (0.64 mol) of monoethanolamine (MEA) as an amine compound B (manufactured by FUJIFILM Wako Pure Chemical Corporation) was added thereto, followed by heating at 140° C. for 3 hours, whereby a second reaction mixture was obtained (the above operations are hereinafter referred to as "second reaction step").

The thus obtained second reaction mixture was sampled, and the XDA concentration (hereinafter, also referred to as "GC concentration") in the second reaction mixture was determined by gas chromatography analysis. The result thereof was as shown in Table 1.

Assuming that the whole amount of the polyurea-containing mixture P1 obtained in the first step was the urea body (polyurea compound) of XDA and MEA, the XDA generation ratio (hereinafter, also referred to as "GC yield") was determined based on the GC concentration. The result thereof was as shown in Table 1 below.

Examples 2 and 3

The same operations were performed as in Example 1, except that a combination of the charged amount of the polyurea-containing mixture P1 and the charged amount of the amine compound B in the second step was changed as shown in Table 1.

The GC concentration and the GC yield of a polyamine compound (i.e., XDA) in the second reaction mixture were as shown in Table 1.

Example 4

(First Step: Decomposition of Thiourethane Resin by Ethylenediamine)

The washed resin powder R1 (30 g) obtained in Reference Production Example 1 was charged into a 500 mL flask equipped with a condenser, and 10.7 g (0.18 mol) of ethylenediamine (EDA) (manufactured by FUJIFILM Wako Pure Chemical Corporation) as an amine compound A and 368 g of toluene were added thereto, followed by heating with stirring at 80° C. for 2 hours and then at 100° C. for 3 hours, whereby a first reaction mixture was obtained (the above operations are hereinafter referred to as "first reaction step").

The thus obtained first reaction mixture was cooled to 60° C., and solid (filtration residue) was separated by filtration. The thus separated solid (filtration residue) was left to stand at room temperature and thereby dried to obtain 25.3 g of a mixture (hereinafter, also referred to as "polyurea-containing mixture P2") containing, as a main component, a urea body (polyurea compound) of XDA and EDA (the above operations are hereinafter referred to as "first separation step").
(Second Step: Decomposition of Urea Body by Monoethanolamine)

In a 100 mL flask equipped with a condenser, the polyurea-containing mixture P2 (10.0 g) obtained in the first step was weighed, and 39.1 g (0.64 mol) of monoethanolamine (MEA) as an amine compound B (manufactured by FUJIFILM Wako Pure Chemical Corporation) was added thereto, followed by heating at 140° C. for 5 hours, whereby a second reaction mixture containing XDA as a polyamine compound was obtained (the above operations are hereinafter referred to as "second reaction step").

Subsequently, the GC concentration and the GC yield of XDA in the second reaction mixture were determined in the same manner as in Example 1. The results thereof were as shown in Table 1.

Example 5

(First Step: Decomposition of Thiourethane Resin by Di-n-butylamine)

The washed resin powder R1 (15 g) obtained in Reference Production Example 1 was charged into a 500 mL flask equipped with a condenser, and 11.3 g (0.09 mol) of di-n-butylamine (DNBA) (manufactured by FUJIFILM Wako Pure Chemical Corporation) as an amine compound A and 176 g of toluene were added thereto, followed by heating with stirring at 100° C. for 4 hours, whereby a first reaction mixture was obtained (the above operations are hereinafter referred to as "first reaction step").

The thus obtained first reaction mixture was cooled to 60° C., and solid was removed by filtration. To the resulting filtrate, 5.3 g of a 28% sodium methoxide methanol solution (manufactured by FUJIFILM Wako Pure Chemical Corporation) was added, followed by stirring. To the resultant, 150 g of water was added to extract insoluble components. The remaining toluene layer was washed three times with 50 ml of water and subsequently concentrated and dried, whereby 16.2 g of a mixture (hereinafter, also referred to as "polyurea-containing mixture P3") containing, as a main component, a urea body (polyurea compound) of XDA and DNBA was obtained (the above operations are hereinafter referred to as "first separation step").

(Second Step: Decomposition of Urea Body by Monoethanolamine)

In a 100 mL flask equipped with a condenser, the polyurea-containing mixture P3 (10.0 g) obtained in the first step was weighed, and 27.4 g (0.45 mol) of monoethanolamine (MEA) as an amine compound B (manufactured by FUJIFILM Wako Pure Chemical Corporation) was added thereto, followed by heating at 140° C. for 5 hours, whereby a second reaction mixture containing XDA as a polyamine compound was obtained (the above operations are hereinafter referred to as "second reaction step")

Subsequently, the GC concentration and the GC yield of XDA in the second reaction mixture were determined in the same manner as in Example 1. The results thereof were as shown in Table 1.

Example 6

(First Step: Decomposition of Thiourethane Resin by Benzylamine)

The washed resin powder R1 (30 g) obtained in Reference Production Example 1 was charged into a 500 mL flask equipped with a condenser, and 26.0 g (0.24 mol) of benzylamine (BA) (manufactured by FUJIFILM Wako Pure Chemical Corporation) as an amine compound A and 349 g of toluene were added thereto, followed by heating with stirring at 100° C. for 3 hours, whereby a first reaction mixture was obtained (the above operations are hereinafter referred to as "first reaction step").

The thus obtained first reaction mixture was cooled to 30° C., and solid (filtration residue) was separated by filtration. The thus separated solid (filtration residue) was left to stand at room temperature and thereby dried to obtain 31.3 g of a mixture (hereinafter, also referred to as "polyurea-containing mixture P4") containing, as a main component, a urea body (polyurea compound) of XDA and BA (the above operations are hereinafter referred to as "first separation step").

(Second Step: Decomposition of Urea Body by Monoethanolamine)

In a 100 mL flask equipped with a condenser, the polyurea-containing mixture P4 (12.9 g) obtained in the first step was weighed, and 39.1 g (0.64 mol) of monoethanolamine (MEA) as an amine compound B (manufactured by FUJIFILM Wako Pure Chemical Corporation) was added thereto, followed by heating at 140° C. for 3 hours, whereby a second reaction mixture containing XDA as a polyamine compound was obtained (the above operations are hereinafter referred to as "second reaction step").

Subsequently, the GC concentration and the GC yield of XDA in the second reaction mixture were determined in the same manner as in Example 1. The results thereof were as shown in Table 1.

Comparative Example 1

(First Step: Decomposition of Thiourethane Resin by Monoethanolamine)

The same operations were performed as in the first step of Example 1 to obtain 28.0 g of the polyurea-containing mixture P1 containing a urea body (polyurea compound) of XDA and MEA as a main component.

(Second Step: Decomposition of Urea Body by Aqueous Sodium Hydroxide Solution)

In a 100 mL flask equipped with a condenser, the polyurea-containing mixture P1 (2.5 g) obtained in the first step was weighed, and 25.6 g (0.32 mol) of an aqueous sodium hydroxide solution having a concentration of 48.6% by mass was added thereto, followed by heating at 105° C. for 5 hours, whereby a reaction mixture 2 was obtained.

This reaction mixture 2 was cooled to room temperature, and extraction was performed three times with 25 g of dichloromethane. The thus collected dichloromethane layer had an amount of 74 g. For this dichloromethane layer, the XDA concentration (hereinafter, also referred to as "GC concentration") in the second reaction mixture was determined by gas chromatography analysis. The result thereof was as shown in Table 1.

Assuming that the whole amount of the polyurea-containing mixture P1 obtained in the first step was the urea body (polyurea compound) of XDA and MEA, the XDA generation ratio (hereinafter, also referred to as "GC yield") was determined based on the GC concentration. The result thereof was as shown in Table 1 below.

TABLE 1

| | | | Example 1 | Example 2 | Example 3 | Example 4 | Example 5 | Example 6 | Comparative Example 1 |
|---|---|---|---|---|---|---|---|---|---|
| First step | Thiourethane resin | Type | R1 | R1 | R1 | R1 | R1 | R1 | R1 |
| | | Charged amount (g) | 30 | 30 | 30 | 30 | 15 | 30 | 30.0 |
| | Amine compound A | Type | MEA | MEA | MEA | EDA | DNBA | BA | MEA |
| | | Molecular weight | 61.08 | 61.08 | 61.08 | 60.10 | 129.24 | 107.15 | 61.08 |
| | | Charged amount (mol) | 0.24 | 0.24 | 0.24 | 0.18 | 0.09 | 0.24 | 0.24 |
| | | Charged equivalent (eq) | 1.5 | 1.5 | 1.5 | 1.1 | 1.1 | 1.5 | 1.5 |

TABLE 1-continued

|  |  |  | Example 1 | Example 2 | Example 3 | Example 4 | Example 5 | Example 6 | Comparative Example 1 |
|---|---|---|---|---|---|---|---|---|---|
|  | First reaction temperature and first reaction time |  | 100° C., 3 h | 100° C., 3 h | 100° C., 3 h | 80° C., 2 h ↓ 100° C., 3 h | 100° C., 4 h | 100° C., 3 h | 100° C., 3 h |
|  | Polyurea-containing mixture | Type | P1 | P1 | P1 | P2 | P3 | P4 | P1 |
|  |  | Yield (g) | 28.0 | 28.0 | 28.0 | 25.3 | 16.2 | 31.3 | 28.0 |
| Second step | Polyurea-containing mixture | Type | P1 | P1 | P1 | P2 | P3 | P4 | P1 |
|  |  | Charged amount (g) | 10.0 | 10.0 | 5.0 | 10.0 | 10.0 | 12.9 | 2.5 |
|  | Amine compound B | Type | MEA | MEA | MEA | MEA | MEA | MEA | — (NaOH) |
|  |  | Charged amount (mol) | 0.64 | 0.32 | 0.64 | 0.64 | 0.45 | 0.64 | — (0.32) |
|  |  | Charged equivalent (eq) | 10 | 5 | 20 | 10 | 10 | 10 | — (20) |
|  | Second reaction temperature (° C.) |  | 140 | 140 | 140 | 140 | 140 | 140 | 105 |
|  | Second reaction time (h) |  | 3 | 3 | 5 | 5 | 5 | 3 | 5 |
|  | Polyamine compound | Type | XDA | XDA | XDA | XDA | XDA | XDA | XDA |
|  |  | GC concentration (%) | 6.2 | 6.9 | 3.7 | 5.6 | 3.9 | 5.3 | 0.2 |
|  |  | GC yield (%) | 70.3 | 46.7 | 75.1 | 63.5 | 48.2 | 63.0 | 5.1 |

In Table 1, "Charged equivalent" of "Amine compound A" means a charged equivalent of each amine compound A with respect to the thiourethane resin.

In Table 1, "Charged equivalent" of "Amine compound B" in Examples 1 to 3 means a charged equivalent of the amine compound B in a case where it is assumed that the polyurea-containing mixture P1 obtained in the first step was entirely a urea body (polyurea compound) of XDA and MEA.

In Table 1, "Charged equivalent" of "Amine compound B" in Example 4 means a charged equivalent of the amine compound B in a case where it is assumed that the polyurea-containing mixture P2 obtained in the first step was entirely a urea body (polyurea compound) of XDA and EDA.

In Table 1, "Charged equivalent" of "Amine compound B" in Example 5 means a charged equivalent of the amine compound B in a case where it is assumed that the polyurea-containing mixture P3 obtained in the first step was entirely a urea body (polyurea compound) of XDA and DNBA.

In Table 1, "Charged equivalent" of "Amine compound B" in Example 6 means a charged equivalent of the amine compound B in a case where it is assumed that the polyurea-containing mixture P4 obtained in the first step was entirely a urea body (polyurea compound) of XDA and BA.

In Table 1, "Charged equivalent" (value in parentheses) of NaOH in Comparative Example 1 means a charged equivalent of NaOH in a case where it is assumed that the polyurea-containing mixture P1 obtained in the first step was entirely a urea body (polyurea compound) of XDA and MEA.

As shown in Table 1, the amount of generated polyamine compound (GC yield) was large in Examples 1 to 6 where a method of producing a polyamine compound, which method included the first step of reacting a thiourethane resin and an amine compound A each other to generate a polyurea compound and the second step of reacting the polyurea compound and an amine compound B each other to generate a polyamine compound, was performed.

On the other hand, in Comparative Example 1 where the amine compound B in the second step was changed to sodium hydroxide (NaOH), the amount of generated polyamine compound (GC yield) was greatly reduced.

Examples 7 to 15

The same operations were performed as in Example 1, except that the conditions of the first step and the second step were changed as shown in Table 2.

The results thereof are shown in Table 2.

The abbreviations used for amine compounds in and after Table 2 have the following meanings.

AEEA: aminoethylethanolamine
NMEA: N-methylethanolamine
NiPrMEA: N-isopropylethanolamine
MEA: monoethanolamine
EDA: ethylenediamine
1,3-PDA: 1,3-propanediamine
TET: triethylenetetramine
TEP: tetraethylenepentamine
DET: diethylenetriamine
PEI1600: polyethylene imine having a molecular weight of 1,600
PEI1800: polyethylene imine having a molecular weight of 1,800
DABCO: 1,4-diazabicyclo[2.2.2]octane

TABLE 2

|  |  |  | Example 7 | Example 8 | Example 9 | Example 10 | Example 11 | Example 12 | Example 13 | Example 14 | Example 15 |
|---|---|---|---|---|---|---|---|---|---|---|---|
| First step | Thiourethane resin | Type | R1 | R1 | R1 | R1 | R1 | R1 | R1 | R1 | R1 |
|  |  | Charged amount (g) | 24.2 | 34.3 | 50.0 | 33.6 | 50.0 | 50.0 | 50.0 | 45.6 | 45.6 |
|  | Amine compound | Type | octylamine | cyclohexylamine | NMEA | NiPrMEA | AEEA | AEEA | AEEA | morpholine | morpholine |

TABLE 2-continued

|  |  |  | Example 7 | Example 8 | Example 9 | Example 10 | Example 11 | Example 12 | Example 13 | Example 14 | Example 15 |
|---|---|---|---|---|---|---|---|---|---|---|---|
|  | A | Molecular weight | 129.25 | 99.18 | 75.11 | 103.17 | 104.15 | 104.15 | 104.15 | 87.12 | 87.12 |
|  |  | Charged amount (mol) | 0.16 | 0.22 | 0.32 | 0.22 | 0.32 | 0.32 | 0.32 | 0.29 | 0.29 |
|  |  | Charged equivalent (eq) | 1.5 | 1.2 | 1.2 | 1.2 | 2.4 | 2.4 | 2.4 | 1.2 | 1.2 |
|  | First reaction temperature and first reaction time |  | 100° C., 5 h | 100° C., 5 h | 100° C., 5 h | 100° C., 5 h | 100° C., 5 h | 100° C., 5 h | 100° C., 5 h | 100° C., 5 h | 100° C., 5 h |
|  | Polyurea-containing mixture | Type | P5 | P6 | P7 | P8 | P9 | P9 | P9 | P10 | P10 |
|  |  | Yield (g) | 25.6 | 36.8 | 45.8 | 29.8 | 70.0 | 70.0 | 70.0 | 41.5 | 41.5 |
| Second step | Polyurea-containing mixture | Type | P5 | P6 | P7 | P8 | P9 | P9 | P9 | P10 | P10 |
|  |  | Charged amount (g) | 25.0 | 5.0 | 30.0 | 12.0 | 10.0 | 10.0 | 10.0 | 5 | 5 |
|  | Amine compound B | Type | AEEA | MEA | EDA | EDA | AEEA | AEEA | AEEA | AEEA | EDA |
|  |  | Charged amount (mol) | 0.28 | 0.26 | 0.89 | 0.30 | 0.13 | 0.06 | 0.03 | 0.07 | 0.14 |
|  |  | Charged equivalent (eq) | 5 | 10 | 10 | 10 | 5 | 2.5 | 1.27 | 5 | 10 |
|  | Second reaction temperature (° C.) |  | 135 | 135 | 115 | 115 | 135 | 135 | 135 | 135 | 115 |
|  | Second reaction time (h) |  | 4 | 7 | 14 | 5 | 6 | 6 | 7 | 4 | 5 |
|  | Polyamine compound | Type | XDA | XDA | XDA | XDA | XDA | XDA | XDA | XDA | XDA |
|  |  | GC concentration (%) | 10.6 | 5.6 | 9.9 | 9.8 | 12.0 | 12.5 | 15.8 | 11.2 | 9.8 |
|  |  | GC yield (%) | 75.2 | 66.0 | 68.1 | 71.4 | 80.5 | 60.4 | 61.2 | 72.6 | 70.1 |

In Table 2, "Charged equivalent" of "Amine compound A" means a charged equivalent of each amine compound A with respect to the thiourethane resin (the same applied to and after Table 3).

In Table 2, "Charged equivalent" of "Amine compound B" in Examples 7 to 15 means a charged equivalent of each amine compound B in a case where it is assumed that the polyurea-containing mixtures P5 to P10 obtained in the first step were each entirely a urea body (polyurea compound) of XDA and the respective amine compound A (the same applied to and after Table 3).

As shown in Table 2, a polyamine compound was generated with a high yield (GC yield) in all of Examples 7 to 15 where a method of producing a polyamine compound, which method included the first step of reacting a thiourethane resin and an amine compound A each other to generate a polyurea compound and the second step of reacting the polyurea compound and an amine compound B with each other to generate a polyamine compound, was performed, Examples 16 to 27

The same operations were performed as in Example 1, except that the conditions of the first step and the second step were changed as shown in Table 3.

The results thereof are shown in Table 3.

TABLE 3

|  |  |  | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|---|
| First step | Thiourethane resin | Thiourethane resin | R1 | R1 | R1 | R1 | R1 | R1 | R1 | R1 | R1 | R1 | R1 | R1 |
|  |  | Charged amount (g) | 50 | 50 | 50 | 50 | 50 | 50 | 50 | 50 | 50 | 50 | 50 | 50 |
|  | Amine compound A | Type | MEA | MEA | MEA | MEA | MEA | MEA | MEA | MEA | MEA | MEA | MEA | MEA |
|  |  | Molecular weight | 61.08 | 61.08 | 61.08 | 61.08 | 61.08 | 61.08 | 61.08 | 61.08 | 61.08 | 61.08 | 61.08 | 61.08 |
|  |  | Charged amount (mol) | 0.32 | 0.32 | 0.32 | 0.32 | 0.32 | 0.32 | 0.32 | 0.32 | 0.32 | 0.32 | 0.32 | 0.32 |
|  |  | Charged equivalent (eq) | 1.2 | 1.2 | 1.2 | 1.2 | 1.2 | 1.2 | 1.2 | 1.2 | 1.2 | 1.2 | 1.2 | 1.2 |
|  | First reaction temperature and first reaction time |  | 90° C., 6 h | 90° C., 6 h | 90° C., 6 h | 90° C., 6 h | 90° C., 6 h | 90° C., 6 h | 90° C., 6 h | 90° C., 6 h | 90° C., 6 h | 90° C., 6 h | 90° C., 6 h | 90° C., 6 h |
|  | Polyurea-containing mixture | Type | P1 | P1 | P1 | P1 | P1 | P1 | P1 | P1 | P1 | P1 | P1 | P1 |
|  |  | Yield (g) | 53.4 | 53.4 | 53.4 | 53.4 | 53.4 | 53.4 | 53.4 | 53.4 | 53.4 | 53.4 | 53.4 | 53.4 |
| Second step | Polyurea-containing mixture | Type | P1 | P1 | P1 | P1 | P1 | P1 | P1 | P1 | P1 | P1 | P1 | P1 |
|  |  | Charged amount (g) | 5.0 | 10.0 | 5.0 | 5.0 | 5.0 | 5.0 | 5.0 | 5.0 | 5.0 | 5.0 | 5.0 | 5.0 |

TABLE 3-continued

| | | Example 16 | Example 17 | Example 18 | Example 19 | Example 20 | Example 21 | Example 22 | Example 23 | Example 24 | Example 25 | Example 26 | Example 27 |
|---|---|---|---|---|---|---|---|---|---|---|---|---|---|
| Amine compound B | Type | EDA | 1,3-PDA | AEEA | AEEA | DET | TET | TEP | TEP | TEP | PEI600 | PEI600 | PEI1800 |
| | Charged amount (mol) | 0.16 | 0.16 | 0.08 | 0.04 | 0.05 | 0.04 | 0.03 | 0.06 | 0.16 | 0.01 | 0.02 | 0.004 |
| | Charged equivalent (eq) | 10 | 5 | 5 | 2.5 | 5 | 5 | 5 | 10 | 25 | 5 | 10 | 5 |
| Second reaction temperature (° C.) | | 140 | 140 | 140 | 140 | 140 | 140 | 140 | 140 | 140 | 140 | 140 | 140 |
| Second reaction time (h) | | 9 | 5 | 5 | 5 | 6 | 6 | 5 | 4 | 5 | 5 | 4 | 4 |
| Polyamine compound | Type | XDA | XDA | XDA | XDA | XDA | XDA | XDA | XDA | XDA | XDA | XDA | XDA |
| | GC concentration (%) | 11.1 | 17.6 | 12.0 | 14.3 | 16.3 | 17.3 | 15.5 | 10.9 | 6.1 | 14.5 | 9.1 | 12.0 |
| | GC yield (%) | 75.2 | 87.8 | 73.5 | 59.9 | 78.1 | 86.0 | 78.2 | 85.4 | 89.3 | 78.9 | 78.5 | 65.1 |
| Amine compound A (regenerated) | Type | MEA | MEA | MEA | MEA | MEA | MEA | MEA | MEA | MEA | MEA | MEA | MEA |
| | GC concentration (%) | 9.4 | 16.6 | 6.1 | 6.1 | 9.7 | 5.5 | 5.8 | 5.7 | 3.0 | 2.8 | 4.1 | 3.3 |
| | GC yield (%) | 71.0 | 92.6 | 41.7 | 28.5 | 52.0 | 30.2 | 32.6 | 49.7 | 54.5 | 17.2 | 39.2 | 19.8 |

As shown in Table 3, a polyamine compound was generated with a high yield (GC yield) in all of Examples 16 to 27 where a method of producing a polyamine compound, which method included the first step of reacting a thiourethane resin and an amine compound A to generate a polyurea compound and the second step of reacting the polyurea compound and an amine compound B to generate a polyamine compound, was performed.

In addition, in Examples 16 to 27, the amine compound A used in the first step was regenerated.

Examples 28 to 34

The same operations were performed as in Example 1, except that the conditions of the first step and the second step were changed as shown in Table 4.

The results thereof are shown in Table 4.

In these Examples, the thiourethane resin R2 (particularly the thiourethane resin powder R2) was used as a thiourethane resin.

Further, in these Examples, a polyurea-containing mixture, an amine compound B, and sodium hydroxide (NaOH (solid)) were mixed and reacted in the second step.

In Table 4, "N.D." means "No data", i.e. the absence of measurement result due to the omission of measurement (the same applied to and after Table 5).

In Table 4, Examples 33 and 34 are each an example where the amine compound A and the amine compound B were of the same kind (specifically MEA), In Examples 33 and 34, the GC concentration and the GC yield of MEA (i.e., compound corresponding to both of the amine compound A and the amine compound B) were each stated as a value of the amine compound A.

TABLE 4

| | | | | Example 28 | Example 29 | Example 30 | Example 31 | Example 32 | Example 33 | Example 34 |
|---|---|---|---|---|---|---|---|---|---|---|
| First step | Thiourethane resin | Type | | R2 | R2 | R2 | R2 | R2 | R2 | R2 |
| | | Charged amount (g) | | 200.0 | 200.0 | 200.0 | 200.0 | 200.0 | 200.0 | 200.0 |
| | Amine compound A | Type | | MEA | MEA | MEA | MEA | MEA | MEA | MEA |
| | | Molecular weight | | 61.08 | 61.08 | 61.08 | 61.08 | 61.08 | 61.08 | 61.08 |
| | | Charged amount (mol) | | 81 | 81 | 81 | 81 | 81 | 81 | 81 |
| | | Charged equivalent (eq) | | 1.2 | 1.2 | 1.2 | 1.2 | 1.2 | 1.2 | 1.2 |
| | First reaction temperature and first reaction time | | | 90° C., 5 h | 90° C., 5 h | 90° C., 5 h | 90° C., 5 h | 90° C., 5 h | 90° C., 5 h | 90° C., 5 h |
| | Polyurea-containing mixture | Type | | P1 | P1 | P1 | P1 | P1 | P1 | P1 |
| | | Yield (g) | | 196.9 | 196.9 | 196.9 | 196.9 | 196.9 | 196.9 | 196.9 |
| Second step | Polyurea-containing mixture | Type | | P1 | P1 | P1 | P1 | P1 | P1 | P1 |
| | | Charged amount (g) | | 31.0 | 31.0 | 100.3 | 31.0 | 31.0 | 31.0 | 102.2 |
| | Amine compound B | Type | | DET | DET | AEEA | TEP | PEI600 | MEA | MEA/TEP |
| | | Charged amount (mol) | | 0.30 | 0.30 | 0.96 | 0.18 | 0.06 | 0.90 | 1.65/0.1 |

TABLE 4-continued

|  |  | Example 28 | Example 29 | Example 30 | Example 31 | Example 32 | Example 33 | Example 34 |
|---|---|---|---|---|---|---|---|---|
| NaOH (solid) | Charged equivalent (eq) | 4.5 | 4.5 | 3 | 4.5 | 4.5 | 4.5 | 2.5/0.8 |
|  | Charged amount (mol) | 0.4 | 0.36 | 1.3 | 0.4 | 0.4 | 0.4 | 1.3 |
|  | Charged equivalent (eq) | 2 | 1.8 | 2 | 2 | 2 | 2 | 2 |
| Second reaction temperature (° C.) |  | 145 | 145 | 145 | 145 | 145 | 145 | 145 |
| Second reaction time (h) |  | 5 | 4 | 7 | 3 | 3 | 3 | 6 |
| Polyamine compound | Type | XDA | XDA | XDA | XDA | XDA | XDA | XDA |
|  | GC concentration (%) | 16.1 | 16.4 | 16.2 | 16.6 | 14.2 | 10.1 | 13.4 |
|  | GC yield (%) | 92.3 | 91.9 | 92.1 | 98.6 | 89.5 | 75.9 | 80.1 |
| Amine compound A (regenerated) | Type | MEA | MEA | MEA | MEA | MEA | MEA | MEA |
|  | GC concentration (%) | 14.7 | 15.1 | 14.5 | 12.5 | 10.6 | 54.1 | 42.8 |
|  | GC yield (%) | 94.1 | 94.2 | 92.0 | 82.8 | 74.3 | 82.1 | 81.6 |
| Amine compound B (regenerated) | Type | DET | DET | AEEA | TEP | PEI600 | MEA | MEA |
|  | GC concentration (%) | 36.6 | 35.1 | 36.3 | N.D. | N.D. | — | — |
|  | GC yield (%) | 92.3 | 86.6 | 91.2 | N.D. | N.D. | — | — |

As shown in Table 4, a polyamine compound was generated with a high yield (GC yield) in all of Examples 28 to 34 where a method of producing a polyamine compound, which method included the first step of reacting a thiourethane resin and an amine compound A to generate a polyurea compound and the second step of reacting the polyurea compound and an amine compound B to generate a polyamine compound, was performed.

In addition, in Examples 28 to 34, the amine compound A used in the first step was regenerated.

Moreover, in Examples 28 to 34, the amine compound B (i.e., MEA) used in the second step was also regenerated by using an inorganic base, NaOH (solid), in the second step.

Examples 35 to 38

The same operations were performed as in Example 1, except that the conditions of the first step and the second step were changed as shown in Table 5.

The results thereof are shown in Table 5.

In these Examples, in the second step, a polyurea-containing mixture and an amine compound B were mixed and reacted at 145° C. for 3 hours to obtain a reaction mixture containing XDA as a polyamine compound, and 45.3 g (1.13 mol) of sodium hydroxide (manufactured by FUJIFILM Wako Pure Chemical Corporation) was added to and reacted with the thus obtained reaction mixture at 145° C. for 3 hours.

TABLE 5

|  |  |  |  | Example 35 | Example 36 | Example 37 | Example 38 |
|---|---|---|---|---|---|---|---|
| First step | Thiourethane resin |  | Type | R2 | R1 | R3 | R4 |
|  |  |  | Charged amount (g) | 200.0 | 33.1 | 200 | 30 |
|  | Amine compound A |  | Type | MEA | aniline/DABCO | MEA | MEA |
|  |  |  | Molecular weight | 61.08 | 93.13 | 61.08 | 61.08 |
|  |  |  | Charged amount (mol) | 81 | 0.45/0.009 | 1.77 | 0.24 |
|  |  |  | Charged equivalent (eq) | 1.2 | 2.5/0.05 | 1.6 | 1.5 |
|  | First reaction temperature and first reaction time |  |  | 90° C., 5 h | 100° C., 7 h | 80° C., 6 h | 100° C., 3 h |
|  | Polyurea-containing mixture |  | Type | P1 | P11 | P12 (68% EG solution) | P12 |
|  |  |  | Yield (g) | 196.9 | 32.2 | 314.0 | 23.6 |
| Second step | Polyurea-containing mixture |  | Type | P1 | P11 | P12 (68% EG solution) | P12 |
|  |  |  | Charged amount (g) | 83.7 | 28.1 | 24.1 | 7.2 |

TABLE 5-continued

|  |  | Example 35 | Example 36 | Example 37 | Example 38 |
|---|---|---|---|---|---|
| Amine compound B | Type | DET | DET | DET | DET |
|  | Charged amount (mol) | 0.81 | 0.23 | 0.15 | 0.07 |
|  | Charged equivalent (eq) | 4.5 | 4.5 | 4.5 | 4.5 |
| NaOH (solid) | Charged amount (mol) | 1.13 | 0.3 | 0.16 | 0.08 |
|  | Charged equivalent (eq) | 2.1 | 2 | 1.6 | 1.8 |
| Second reaction temperature (° C.) |  | 145 | 145 | 145 | 145 |
| Second reaction time (h) |  | 3/3 | 3/3 | 3/3 | 3/3 |
| Polyamine compound | Type | XDA | XDA | NBDA | NBDA |
|  | GC concentration (%) | 15.7 | 14.2 | 6.0 | 17.6 |
|  | GC yield (%) | 90.3 | 88.2 | 35.9 | 89.2 |
| Amine compound A (regenerated) | Type | MEA | aniline | MEA | MEA |
|  | GC concentration (%) | 13.7 | N.D | 9.8 | 15.1 |
|  | GC yield (%) | 88.1 | — | 73.7 | 96.5 |
| Amine compound B (regenerated) | Type | DET | DET | DET | DET |
|  | GC concentration (%) | 35.7 | 29.9 | 20.7 | 36.8 |
|  | GC yield (%) | 90.4 | 81.5 | 57.9 | 92.9 |

As shown in Table 5, a polyamine compound was generated with a high yield (GC yield) in all of Examples 35 to 38 where a method of producing a polyamine compound, which method included the first step of reacting a thiourethane resin and an amine compound A each other to generate a polyurea compound and the second step of reacting the polyurea compound and an amine compound B with each other to generate a polyamine compound, was performed.

In addition, in Examples 35, 37, and 38, the amine compound A used in the first step was regenerated.

Moreover, in Examples 35 to 38, the amine compound B used in the second step was also regenerated by using an inorganic base, NaOH (solid), in the second step.

Example 101

(Isolation and Purification of XDA)

In a 500 mL flask equipped with a condenser, the polyurea-containing mixture P4 (60.4 g) containing a urea body of XDA and BA as a main component (the polyurea-containing mixture P4 obtained in Example 6) was weighed, and MEA as an amine compound B (183.2 g; 3.0 mol) was added thereto, followed by heating at 140° C. for 5 hours, whereby a second reaction mixture was obtained.

The thus obtained second reaction mixture was sampled, and the XDA concentration (hereinafter, also referred to as "GC concentration") in the second reaction mixture was determined to be 5.1% as a result of gas chromatography analysis.

Assuming that the polyurea-containing mixture P4 was entirely the urea body (polyurea compound) of XDA and BA, the XDA generation ratio (GC yield) was determined to be 60.7% based on the GC concentration.

—First Extraction—

The second reaction mixture (235.2 g) was charged into a 500 mL reactor equipped with a stirrer, and 150 g of toluene was added thereto, followed by heating to 60° C. with stirring. After the temperature of the second reaction mixture reached 60° C., the second reaction mixture was stirred for 1 hour. Subsequently, the stirring was stopped, and a toluene layer was collected by liquid separation (the above operations are hereinafter referred to as "first extraction"). The toluene layer collected in this first extraction had an amount of 100.1 g and, as a result of gas chromatography analysis, the toluene layer was found to have a formulation containing XDA (1.5%), BA (7.7%), and MEA (2.7%) (see Table 6).

—Second Extraction to Sixth Extraction—

Next, for the second reaction mixture in the reactor, the same operations as those of the first extraction were performed five times (second extraction to sixth extraction).

The amount and the formulation of a toluene layer collected in each of the second extraction to the sixth extraction were as shown in Table 6.

TABLE 6

| | Mass and formulation of collected toluene layer | | | |
|---|---|---|---|---|
| | Mass | XDA | BA | MEA |
| First extraction | 100.1 g | 1.5% | 7.7% | 2.7% |
| Second extraction | 153.1 g | 1.1% | 4.3% | 1.8% |
| Third extraction | 143.5 g | 0.9% | 2.3% | 1.3% |
| Fourth extraction | 125.5 g | 0.8% | 1,2% | 1.5% |
| Fifth extraction | 108.8 g | 0.6% | 0.7% | 1.3% |
| Sixth extraction | 135.7 g | 0.6% | 0.4% | 1.4% |

Next, all of the toluene layers collected by the first extraction to the sixth extraction were mixed together, and toluene was distilled away from the thus obtained mixture using a rotary evaporator to obtain an XDA-containing amine mixture in an amount of 46.6 g. As a result of gas chromatography analysis, this amine mixture was found to contain XDA (14.3%), BA (33.8%), and MEA (28.4%).

The amine mixture was subjected to an purification operation using a vacuum distillation apparatus to collect components at a column top temperature of 118° C. and a vacuum degree of 9 mmHg, whereby XDA (m-xylylenediamine) was isolated (yield: 5.2 g).

It is possible to produce m-xylylene diisocyanate (XDI) by reacting at least one of the thus isolated XDA or a hydrochloride thereof and carbonyl dichloride with each other in accordance with a known reaction method and thereby converting each of the two amino groups in XDA into an isocyanato group.

Using the thus produced XDI, a formed body containing a thiourethane resin, as well as a lens can be produced in the same manner as in Reference Production Example 1.

In this manner, effective utilization of materials (i.e., thiourethane resin and its raw material, XDI) is realized.

Example 102

(Isolation and Purification of XDA)

The second reaction mixture obtained in Example 30 was vacuum-filtered using a nutsche to remove a carbonate. The thus removed carbonate was extracted and washed with methanol, and subsequently vacuum-filtered again. The resulting filtrate was mixed, and methanol was removed using a rotary evaporator, after which simple distillation was performed using a distillation apparatus to obtain 170.4 g of an XDA-containing amine mixture. As a result of gas chromatography analysis, this amine mixture was found to contain XDA (23.7%), AEEA (21.5%), and MEA (54.0%). This mixture was once again purified by distillation to remove MEA having a low boiling point, whereby a mixture of XDA and AEEA was obtained.

Example 103

(Isolation and Purification of XDA)

The second reaction mixture obtained in Example 35 was vacuum-filtered using a nutsche to remove a carbonate. The thus removed carbonate was extracted and washed with methanol, and subsequently vacuum-filtered again. The resulting filtrate was mixed, and methanol was removed using a rotary evaporator, after which simple distillation was performed using a distillation apparatus to obtain 131.4 g of an XDA-containing amine mixture. As a result of gas chromatography analysis, this amine mixture was found to contain XDA (21.0%), DET (57.5%), and MEA (21.3%).

Example 104

A mixture obtained by the same operations as the mixture obtained in Example 102 was prepared in 7 batches of 1,283 g, and purified by distillation. This mixture was fractionated by vacuum distillation (vacuum degree: 1 to 2 Torr) to obtain 93.3 g of m-xylylenediamine (XDA). In addition, 1,120 g of AEEA corresponding to the amine compound B was obtained.

Example 105

A mixture obtained by the same operations as the mixture obtained in Example 103 was prepared in 6 batches of 965 g, and purified by distillation. This mixture was fractionated by vacuum distillation (vacuum degree: 1 to 2 Torr) to obtain 223.7 g of m-xylylenediamine (XDA).

Example 106

(Production of Recycled XDI)

In an Erlenmeyer flask, 68.1 g (0.50 mol) of m-xylylenediamine (i.e., XDA) obtained in Example 105 and 309.9 g of o-dichlorobenzene (i.e., ODCB) were added to prepare a dropping solution. Then, 423.2 g of ODCB was charged into a IL flask equipped with a reflux condenser, a thermometer, and a gas blow pipe. While stirring at 100° C., the dropping solution was fed thereto over a period of 3 hours at a flow rate of 2 mL/min using a feed pump (HPLC pump PU-980, manufactured by JASCO Corporation). In this process, simultaneously with the feeding of the solution, 100 g of hydrochloric acid gas was also blown into the flask over a period of 3 hours. Subsequently, the blowing of hydrochloric acid gas was stopped, and the resultant was stirred with heating for 30 minutes, after which nitrogen gas was blown thereinto for 1 hour to remove unreacted hydrochloric acid gas. Thereafter, the resultant was heated to 160° C., and 593 g of phosgene gas was blown thereinto over a period of 6 hours, after which nitrogen gas was blown thereinto for 1 hour to remove unreacted phosgene.

Example 107

(Production of Recycled XDI)

In an Erlenmeyer flask, 136.2 g (1.0 mol) of m-xylylenediamine (i.e., XDA) obtained in Example 105 and 620.4 g of ODCB were added to prepare a dropping solution. Then, 845.6 g of ODCB was charged into a 2 L flask equipped with a reflux condenser, a thermometer, and a gas blow pipe. While stirring at 100° C., the dropping solution was fed thereto over a period of 6 hours at a flow rate of 2 ml/min using a feed pump. In this process, simultaneously, 200 g of hydrochloric acid gas was also blown into the flask over a period of 6 hours. Subsequently, the blowing of hydrochloric acid gas was stopped, and the resultant was stirred with heating for 30 minutes, after which nitrogen gas was blown thereinto for 1 hour to remove unreacted hydrochloric acid gas. Thereafter, the resultant was heated to 160° C., and 1,186 g of phosgene gas was blown thereinto over a period of 6 hours, after which nitrogen gas was blown thereinto for 1 hour to remove unreacted phosgene.

Example 108

(Production of Recycled XDI)

The reaction solutions thus obtained in Examples 106 and 107 were mixed, and the resulting precipitates were removed by vacuum filtration. Subsequently, ODCB was distilled off by an desolvation operation, and fractionation by vacuum distillation (vacuum degree: 0.5 to 1.0 Torr) was performed, whereby 93.9 g of XDI containing 0.8% by weight of m-(chloromethyl)benzyl isocyanate (i.e., m-CBI) was obtained.

Example 109

(Production of Formed body Containing Thiourethane Resin)

A formed body containing the thiourethane resin R2 was obtained by performing the same operations as in production of a formed body in Reference Production Example 2, except that the XDI (52 parts by mass) used in Reference Production Example 2 was changed to the XDI (52 parts by mass) obtained in Example 108.

The thus obtained formed body had favorable transparency and favorable outer appearance with no distortion.

Example 110

(Production of Formed body Containing Thiourethane Resin)

A formed body containing the thiourethane resin R2 was obtained by performing the same operations as in production of a formed body in Reference Production Example 2, except that 26 parts by mass of the XDI (52 parts by mass) used in Reference Production Example 2 was changed to the XDI (26 parts by mass) obtained in Example 108.

Performance tests were conducted for the thus obtained formed bodies.

The results thereof are shown in Table 7.

The items of the performance tests were optical properties (refractive index and Abbe number), heat resistance, and specific gravity d. These items were tested by the following respective test methods.

Refractive index (ne) and Abbe number (ve): using a Pulfrich refractometer KPR-30 manufactured by Shimadzu Corporation, the refractive indices (ne, nF', and nC') at 20° C. were measured at wavelengths of 546.1 nm (mercury e-line), 480.0 nm (Cd F'-line), and 643.9 nm (Cd C'-line), respectively, and the refractive index (ne) and the Abbe number (ve) were determined based on the measurement results.

Heat resistance: using a thermomechanical analyzer TMA-60 manufactured by Shimadzu Corporation, the glass transition temperature (Tg) was measured by a TMA penetration method (load: 50 g, pin tip: 0.5 mmo, heating rate: 10° C./min), and the measured value was used as an index of the heat resistance.

Specific gravity d: measured at 20° C. by Archimedes' method.

The same performance tests were conducted also for the formed body obtained in Reference Production Example 2.

The results thereof are shown in Table 7.

TABLE 7

| | Polymerizable composition (parts by mass in parentheses) | | | Performance test of formed body | | | |
|---|---|---|---|---|---|---|---|
| | | | | Optical properties | | Heat resistance | Specific gravity |
| | Isocyanate compound | | Polythiol composition | Refractive index | Abbe number | Tg (° C.) | d |
| Reference Production Example 2 | XDI (52) | — | Composition X2 (48) | 1.665 | 32 | 85 | 1.35 |
| Example 109 | XDI obtained in Example 108 (52) | — | Composition X2 (48) | 1.665 | 31 | 86 | 1.36 |
| Example 110 | XDI obtained in Example 108 (26) | XDI (26) | Composition X2 (48) | 1.665 | 31 | 87 | 1.36 |

As shown in Table 7, the formed bodies of Examples 109 and 110, which were produced using the polyisocyanate compounds synthesized using the polyamine compounds produced in the respective Examples (i.e., polyisocyanate compounds each synthesized using a polyamine compound obtained by decomposing a polyurea compound, which was obtained by reacting the polyurethane resin powder obtained by cutting the formed body of Reference Production Example 2 with an amine compound A, by an amine compound B), had performance comparable to those of the formed body of Reference Production Example 2.

As described above, a polyisocyanate compound (e.g., XDI) can be produced using a polyamine compound (e.g., XDA) produced by a method of producing a polyamine compound, which method includes the first step of reacting a thiourethane resin and an amine compound A with each other to generate a polyurea compound and the second step of reacting the polyurea compound and an amine compound B with each other to generate a polyamine compound. In addition, using the thus produced XDI, a formed body containing a thiourethane resin, as well as a lens can be produced in the same manner as in Reference Production Example 2.

In this manner, effective utilization of materials (i.e., thiourethane resin and its raw material, XDI) is realized.

Reference Production Example 201

(Production of Formed body Containing Thiourethane Resin R1)

In a flask equipped with a stirrer, dimethyl tin dichloride (trade name: NESTIN-P, manufactured by The Honjo Chemical Corporation) (100 ppm by mass with respect to a total amount of the below-described polyisocyanate compound and the below-described polythiol composition X1) as a polymerization catalyst, ZELEC-UN (manufactured by Stepan Company; acidic phosphoric acid ester) (1,000 ppm by mass with respect to a total amount of the below-described polyisocyanate compound and the below-described polythiol composition X1) as a mold release agent, m-xylylene diisocyanate (XDI) (50.8 parts by mass) as a polyisocyanate compound, and a polythiol composition X1 (49.2 parts by mass) containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component were added and mixed with stirring for 1 hour at room temperature to obtain a polymerizable composition in the form of a transparent homogeneous solution.

It is noted here that the purity of the polythiol component A1 in the polythiol composition X1 (i.e., the content of the polythiol component A1 with respect to a total amount of the polythiol composition X1) was 85.5%.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then this pair of glass molds was placed in an oven, after which the oven internal temperature was set at 25° C. Subsequently, the oven internal temperature was raised from 25° C. to 120° C. over a period of 24 hours. By this process, monomers (the polyisocyanate compound and the polythiol composition) contained in the degassed polymerizable composition were polymerized to form a formed body containing a thiourethane resin R1 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.

(Production of Thiourethane Resin Powder)

A lens was produced by cutting the thus obtained formed body. A cut powder generated in this process was collected and applied to a sieve having a nominal mesh size of 1 mm as defined by JIS Z-8801-1:2019, whereby a thiourethane resin powder R1 passed through the sieve (i.e., powder containing the thiourethane resin R1) was obtained.

(Washing of Thiourethane Resin Powder: Washing Step)

The thus obtained thiourethane resin powder R1 (30 g) was weighed. A washing operation consisting of adding 150 g of toluene to this thiourethane resin powder R1 (30 g), stirring the resultant, and then removing toluene by filtration was performed three times. The thiourethane resin powder R1 thus subjected to the washing operation three times was transferred to a magnetic dish and dried to obtain a washed resin powder.

Example 201

(Step X1: Decomposition of Thiourethane Resin R1 by 1-octanol)

The washed resin powder (15.0 g) obtained in Reference Production Example 201 was charged into a 300 mL flask equipped with a condenser, and 105.23 g (0.808 mol) of 1-octanol as an alcohol compound (manufactured by FUJIFILM Wako Pure Chemical Corporation) and 10.83 g (0.121 mol) of N,N-dimethylethanolamine (manufactured by Tokyo Chemical Industry Co., Ltd.) as an amine compound XA, which was a tertiary amine compound, were added thereto, followed by heating with stirring at 130° C. (reaction temperature X1) for 6 hours (reaction time X1), whereby a reaction mixture X1 was obtained (the above operations are hereinafter referred to as "reaction step X1").

In this Example 201, no reaction solvent X1 was used.

It is noted here that, in Example where a reaction solvent X1 was used (i.e., the below-described Example 203), the alcohol compound, the amine compound XA, and the reaction solvent were added to the above-described flask, and these materials were heated with stirring at a prescribed reaction temperature for a prescribed reaction time to obtain the reaction mixture X1.

The thus obtained reaction mixture X1 was cooled to room temperature, and solid was subsequently removed by filtration. To the resulting filtrate, 50 g of benzyl alcohol was charged as a separation solvent X1, and this filtrate was washed twice with 100 mL of 1N hydrochloric acid to remove amines, and then washed twice with 50 mL of water to remove excess hydrochloric acid. Subsequently, a 28% sodium methoxide methanol solution (manufactured by FUJIFILM Wako Pure Chemical Corporation) (11.04 g; 0.057 mol) was added, followed by stirring. The resultant was washed by adding thereto 200 g of water to remove salts and subsequently concentrated using a rotary evaporator, after which alcohol was distilled away by heating the resultant to 100° C. in an oil bath while reducing the pressure to 1 mmHg using a vacuum pump, whereby 18.38 g of a mixture (hereinafter, also referred to as "polycarbamate-containing mixture P1") containing, as a main component, a carbamate body (polycarbamate compound) of m-xylylenediamine (hereinafter, also referred to as "XDA") and 1-octanol (the above operations are hereinafter referred to as "separation step X2").

(Step X2: Decomposition of Carbamate Body by Monoethanolamine)

In a 200 mL flask equipped with a condenser, the polyurethane-containing mixture P1 (18.38 g) obtained in the step X1 was weighed, and 49.35 g (0.808 mol) of monoethanolamine (MEA) as an amine compound XB (manufactured by FUJIFILM Wako Pure Chemical Corporation) was added thereto, followed by heating at 140° C. (reaction temperature X2) for 11 hours (reaction time X2), whereby a reaction mixture X2 was obtained (the above operations are hereinafter referred to as "reaction step X2").

The thus obtained reaction mixture X2 was sampled, and the XDA concentration (hereinafter, also referred to as "GC concentration") in the reaction mixture X2 was determined by gas chromatography analysis. The result thereof was as shown in Table 8.

Assuming that the whole amount of the polyurethane-containing mixture P1 obtained in the step X1 was the carbamate body (polycarbamate compound) of XDA and 1-octanol, the XDA generation ratio (hereinafter, also referred to as "GC yield") was determined based on the GC concentration. The result thereof was as shown in Table 8 below.

Examples 202 and 203

The same operations as in Example 201 were performed, except that the amount of the thiourethane resin powder, the conditions of the step X1 (e.g., the type and the charged amount of the alcohol compound, the type and the charged amount of the amine compound XA, the presence or absence of the reaction solvent X1, the reaction temperature X1, the reaction time X1, and the presence or absence of the separation solvent X1), and the conditions of the step X2 (e.g., the type and the charged amount of the amine compound XB, the reaction temperature X2, and the reaction time X2) were changed as shown in Table 8.

The GC concentration and the GC yield of XDA are shown in Table 8.

Comparative Example 1

(Step X1: Decomposition of Thiourethane Resin by 1-octanol)

The same operations were performed as in the step X1 of Example 202 to obtain the polycarbamate-containing mixture P1 containing a carbamate body (polycarbamate compound) of XDA and 1-octanol as a main component.

(Step X2: Decomposition of Carbamate Body by Aqueous Sodium Hydroxide Solution)

In a 100 mL flask equipped with a condenser, the polyurethane-containing mixture P1 (14.9 g) obtained in the step X1 was weighed, and 54.3 g (0.66 mol) of an aqueous sodium hydroxide solution having a concentration of 48.6% by mass was added thereto, followed by heating at 110° C. for 8 hours, whereby a reaction mixture 2 was obtained.

This reaction mixture 2 was cooled to room temperature, 50 g of dichloromethane was added thereto, and the resultant was vacuum-filtered to remove insoluble matters. This filtration required 1 hour until completion due to poor filterability. Subsequently, extraction was performed with 50 g of dichloromethane. The thus collected dichloromethane layer had an amount of 85.0 g. For this dichloromethane layer, the XDA concentration (hereinafter, also referred to as "GC concentration") in the reaction mixture X2 was determined by gas chromatography analysis. The result thereof was as shown in Table 8.

Assuming that the whole amount of the polyurethane-containing mixture P1 obtained in the step X1 was the carbamate body (polyurethane compound) of XDA and 1-octanol, the XDA generation ratio (hereinafter, also referred to as "GC yield") was determined based on the GC concentration. The result thereof was as shown in Table 8 below.

In Table 8, "Charged equivalent" (value in parentheses) of NaOH in Comparative Example 1 means a charged equivalent of NaOH in a case where it is assumed that the polycarbamate-containing mixture P1 obtained in the step X1 was entirely a carbamate body (polycarbamate compound) of XDA and 1-octanol.

As shown in Table 8, the amount of generated polyamine compound (GC yield) was large in Examples 201 to 203 where a method of producing a polyamine compound, which method included the step X1 of reacting a thiourethane resin and an alcohol compound with each other to generate a polycarbamate compound and the step X2 of reacting the

TABLE 8

|  |  |  | Example 201 | Example 202 | Example 203 | Comparative Example 201 |
|---|---|---|---|---|---|---|
| Step X1 | Thiourethane resin | Charged amount (g) | 15.0 | 12.5 | 15.0 | 15.0 |
|  | Alcohol compound | Type | 1-octanol | 1-octanol | propylene glycol | 1-octanol |
|  |  | Molecular weight | 130 | 130 | 76 | 130 |
|  |  | Boiling point (° C.) | 195 | 195 | 188 | 195 |
|  |  | Charged amount (mol) | 0.808 | 0.673 | 0.121 | 0.808 |
|  |  | Charged equivalent (eq) | 10.0 | 10.0 | 1.5 | 10.0 |
|  | Amine compound XA | Type | N,N-dimethyl-ethanolamine | diisopropyl-ethylamine | N,N-dimethyl-ethanolamine | diisopropyl-ethylamine |
|  |  | Molecular weight | 89 | 129 | 89 | 129 |
|  |  | Boiling point (° C.) | 133 | 127 | 133 | 127 |
|  |  | Charged amount (mol) | 0.121 | 0.101 | 0.121 | 0.12 |
|  |  | Charged equivalent (eq) | 1.5 | 1.5 | 1.5 | 1.5 |
|  | Reaction solvent X1 |  | none | none | m-xylene (80 g) | none |
|  | Reaction temperature X1 and reaction time X1 |  | 130° C., 6 h | 130° C., 20 h | 130° C., 14 h | 130° C., 16 h |
|  | Separation solvent X1 |  | benzyl alcohol (50 g) | benzyl alcohol (50 g) | none | benzyl alcohol (50 g) |
|  | Polycarbamate-containing mixture | Type | P1 | P1 | P2 | P1 |
|  |  | Yield (g) | 18.4 | 14.4 | 4.4 | 14.9 |
| Step X2 | Polycarbamate-containing mixture | Type | P1 | P1 | P2 | P1 |
|  |  | Charged amount (g) | 18.4 | 14.4 | 4.4 | 14.9 |
|  | Amine compound XB | Type | MEA | MEA | MEA | — (NaOH) |
|  |  | Charged amount (mol) | 0.81 | 0.23 | 0.26 | — (0.67) |
|  |  | Charged equivalent (eq) | 10 | 3.5 | 10 | — (10) |
|  | Separation aspect |  | Separation aspect A | Separation aspect A | Separation aspect A | Separation aspect A |
|  | Reaction temperature X2 (° C.) |  | 140 | 140 | 140 | 110 |
|  | Reaction time X2 (h) |  | 11 | 22 | 8 | 8 |
|  | Polyamine compound | Type | XDA | XDA | XDA | XDA |
|  |  | GC concentration (%) | 5.9 | 6.7 | 6.3 | 3.1* |
|  |  | GC yield (%) | 67.0 | 38.8 | 64.4 | 57.5* |

*GC analysis result of dichloromethane extract

In Table 8, "Charged equivalent" of "Alcohol compound" means a charged equivalent of each alcohol compound with respect to the thiourethane resin, and "Charged equivalent" of "Amine compound XA" means a charged equivalent of each amine compound XA with respect to the thiourethane resin.

In Table 8, "Charged equivalent" of "Amine compound XB" in Examples 201 and 202 means a charged equivalent of the amine compound XB in a case where it is assumed that the polycarbamate-containing mixture P1 obtained in the step X1 was entirely a carbamate body (polycarbamate compound) of XDA and 1-octanol In Table 8, "Charged equivalent" of "Amine compound XB" in Example 203 means a charged equivalent of the amine compound XB in a case where it is assumed that the polycarbamate-containing mixture P2 obtained in the step X1 was entirely a carbamate body (polycarbamate compound) of XDA and propylene glycol.

polycarbamate compound and an amine compound XB with each other to generate a polyamine compound, was performed.

On the other hand, in Comparative Example 1 where the amine compound XB in the step X2 was changed to sodium hydroxide (NaOH), although the amount of generated polyamine compound (GC yield) was equivalent, a halogen solvent such as dichloromethane was required for extraction from an aqueous layer. In addition, there is a problem in that the generation of a large amount of insoluble matters in the second step makes the separation operation complicated.

Examples 204 to 208

The same operations were performed as in Example 201, except that the conditions of the step X1 and the step X2 were changed as shown in Table 9.

The results thereof are shown in Table 9.

In Example 208, a polyurea-containing mixture, an amine compound B, and sodium hydroxide (NaOH (solid)) were mixed and reacted in the step X2.

TABLE 9

|  |  |  | Example 204 | Example 205 | Example 206 | Example 207 | Example 208 |
|---|---|---|---|---|---|---|---|
| Step X1 | Thiourethane resin | Charged amount (g) | 33.1 | 33.1 | 33.1 | 33.1 | 33.1 |
|  | Alcohol compound | Type | 1-pentanol | phenethyl alcohol | 2-octanol | 1-octanol | 1-octanol |
|  |  | Molecular weight | 88 | 122 | 130 | 130 | 130 |
|  |  | Boiling point (° C.) | 137 | 219 | 179 | 195 | 195 |
|  |  | Charged amount (mol) | 0.267 | 0.267 | 0.267 | 0.267 | 0.267 |
|  |  | Charged equivalent (eq) | 1.5 | 1.5 | 1.5 | 1.5 | 1.5 |
|  | Amine compound XA | Type | DABCO | DABCO | DABCO | DABCO | DABCO |
|  |  | Molecular weight | 112 | 112 | 112 | 112 | 112 |
|  |  | Boiling point (° C.) | 174 | 174 | 174 | 174 | 174 |
|  |  | Charged amount (mol) | 0.009 | 0.009 | 0.009 | 0.009 | 0.009 |
|  |  | Charged equivalent (eq) | 0.05 | 0.05 | 0.05 | 0.05 | 0.05 |
|  | Reaction solvent X1 |  | none | none | none | none | none |
|  | Reaction temperature X1 and reaction time X1 |  | 160° C., 5 h | 160° C., 6 h | 160° C., 7 h | 160° C., 7 h | 160° C., 7 h |
|  | Separation solvent X1 |  | benzyl alcohol (100 g) | benzyl alcohol (100 g) | benzyl alcohol (100 g) | benzyl alcohol (100 g) | benzyl alcohol (100 g) |
|  | Polycarbamate-containing mixture | Type | P3 | P4 | P5 | P1 | P1 |
|  |  | Yield (g) | 49.4 | 35.8 | 38.4 | 37.0 | 37.0 |
| Step X2 | Polycarbamate-containing mixture | Type | P3 | P4 | P5 | P1 | P1 |
|  |  | Charged amount (g) | 20.0 | 20.0 | 15.0 | 20.0 | 5.0 |
|  | Amine compound XB | Type | AEEA | AEEA | AEEA | AEEA | DET |
|  |  | Charged amount (mol) | 0.39 | 0.46 | 0.30 | 0.45 | 0.03 |
|  |  | Charged equivalent (eq) | 7 | 10 | 9 | 10 | 4 |
|  | NaOH (solid) | Charged amount (mol) | — | — | — | — | 0.04 |
|  |  | Charged equivalent (eq) | — | — | — | — | 2 |
|  | Reaction temperature X2 (° C.) |  | 145 | 145 | 145 | 145 | 145 |
|  | Reaction time X2 (h) |  | 17 | 7 | 17 | 20 | 3 |
|  | Polyamine compound | Type | XDA | XDA | XDA | XDA | XDA |
|  |  | GC concentration (%) | 6.6 | 8.5 | 6.0 | 8.8 | 13.8 |
|  |  | GC yield (%) | 75.4 | 92.4 | 68.2 | 96.4 | 94.0 |
|  | Amine compound B (regenerated) | Type | — | — | — | — | DET |
|  |  | GC concentration (%) | — | — | — | — | 22.1 |
|  |  | GC yield (%) | — | — | — | — | 65.6 |

*Result of GC analysis of dichloromethane extract

As shown in Table 9, the amount of generated polyamine compound (GC yield) was large in Examples 204 to 208 where a method of producing a polyamine compound, which method included the step X1 of reacting a thiourethane resin and an alcohol compound with each other to generate a polycarbamate compound and the step X2 of reacting the polycarbamate compound and an amine compound XB with each other to generate a polyamine compound, was performed.

Further, in Example 208, the amine compound XB used in the step X2 was regenerated by using an inorganic base, NaOH (solid), in the step X2.

Example 301

(Isolation and Purification of XDA)

The reaction mixture (61.73 g) obtained in Example 201 was charged into a liquid-liquid extraction apparatus (manufactured by VIDTEC) and extracted with toluene for 17 hours. The thus collected toluene layer had an amount of 64.70 g and, as a result of gas chromatography analysis, the toluene layer was found to have a formulation containing XDA (3.9%), 1-octanol (10.94%), and benzyl alcohol (0.91%).

Toluene was distilled away from the thus obtained mixture using a rotary evaporator to obtain an XDA-containing amine mixture in an amount of 12.68 g. As a result of gas chromatography analysis, this amine mixture was found to contain XDA (19.98%), 1-octanol (52.67%), and benzyl alcohol (7.74%).

The amine mixture was subjected to an purification operation using a vacuum distillation apparatus to collect components at a column top temperature of 118° C. and a vacuum degree of 1 mmHg, whereby XDA (m-xylylenediamine) was isolated (yield: 1.8 g).

Example 302

(Isolation and Purification of XDA)

The reaction mixture (24.56 g) obtained in Example 202 was charged into a liquid-liquid extraction apparatus (manufactured by VIDTEC) and extracted with toluene for 8 hours. The thus collected toluene layer had an amount of 72.07 g and, as a result of gas chromatography analysis, the toluene layer was found to have a formulation containing XDA (1.92%), 1-octanol (8.67%), and benzyl alcohol (1.43%).

Toluene was distilled away from the thus obtained mixture using a rotary evaporator to obtain an XDA-containing amine mixture in an amount of 10.90 g. As a result of gas chromatography analysis, this amine mixture was found to contain XDA (11.53%), 1-octanol (50.43%), and benzyl alcohol (2.21%).

By purifying the amine mixture using a vacuum distillation apparatus in the same manner as in Example 301, m-xylylenediamine can be isolated.

Example 303

(Isolation and Purification of XDA)

The reaction mixture (17.31 g) obtained in Example 203 was charged into a liquid-liquid extraction apparatus (manufactured by VIDTEC) and extracted with toluene for 14 hours. The thus collected toluene layer had an amount of 126.98 g and, as a result of gas chromatography analysis, the toluene layer was found to have a formulation containing XDA (2.66%).

Toluene was distilled away from the thus obtained mixture using a rotary evaporator to obtain an XDA-containing amine mixture in an amount of 1.66 g. As a result of gas chromatography analysis, this amine mixture was found to contain XDA (70.02%).

By purifying the amine mixture using a vacuum distillation apparatus in the same manner as in Example 301, m-xylylenediamine can be isolated.

Example 304

(Isolation and Purification of XDA)

The reaction mixture (17.31 g) obtained in Example 203 was charged into a liquid-liquid extraction apparatus (manufactured by VIDTEC) and extracted with toluene for 14 hours. The thus collected toluene layer had an amount of 126.98 g and, as a result of gas chromatography analysis, the toluene layer was found to have a formulation containing XDA (2.66%).

Toluene was distilled away from the thus obtained mixture using a rotary evaporator to obtain an XDA-containing amine mixture in an amount of 1.66 g. As a result of gas chromatography analysis, this amine mixture was found to contain XDA (70.02%).

By purifying the amine mixture using a vacuum distillation apparatus in the same manner as in Example 301, m-xylylenediamine can be isolated.

It is possible to produce m-xylylene diisocyanate (XDI) by reacting at least one of the thus isolated XDA or a hydrochloride thereof with carbonyl dichloride in accordance with a known reaction method and thereby converting each of the two amino groups in XDA into an isocyanato group.

Using the thus produced XDI, a formed body containing a thiourethane resin can be produced in the same manner as in Reference Production Example 201, and a lens can also be produced in the same manner as in Reference Production Example 202.

In this manner, effective utilization of materials (i.e., thiourethane resin and its raw material, XDI) is realized.

The disclosures of Japanese Patent Application No. 2020-017717 filed on Feb. 5, 2020, Japanese Patent Application No. 2020-017718 filed on Feb. 5, 2020, Japanese Patent Application No. 2020-086644 filed on May 18, 2020, Japanese Patent Application No. 2020-086645 filed on May 18, 2020, and Japanese Patent Application No. 2020-192461 filed on Nov. 19, 2020 are hereby incorporated by reference in their entirety.

All the documents, patent applications and technical standards that are described in the present specification are hereby incorporated by reference to the same extent as if each individual document, patent application or technical standard is concretely and individually described to be incorporated by reference.

The invention claimed is:

1. A method of producing a polyamine compound, the method comprising:
    generating a polyurea compound by reacting a thiourethane resin and an amine compound A with each other; and
    generating a polyamine compound by reacting the polyurea compound and an amine compound B with each other.

2. The method of producing a polyamine compound according to claim 1, wherein, the thiourethane resin and the amine compound A are reacted with each other under a temperature condition of from 70° C. to 140° C.

3. The method of producing a polyamine compound according to claim 1, wherein, the polyurea compound and the amine compound B are reacted with each other under a temperature condition of from 100° C. to 180° C.

4. The method of producing a polyamine compound according to claim 1, wherein generating the polyamine compound comprises:
    reacting the polyurea compound and the amine compound B with each other to generate a polyamine compound and a reaction by-product; and
    reacting the reaction by-product and an inorganic base with each other to generate the amine compound B.

5. The method of producing a polyamine compound according to claim 1, wherein:
    the amine compound A is an amine compound of 300 or less in molecular weight, which comprises at least one of an amino group or a monoalkylamino group, and has a total number of amino groups and monoalkylamino groups of 1 or 2, and
    the amine compound B is an amine compound of 2,000 or less in molecular weight, which comprises at least one of an amino group or a monoalkylamino group, and has a total number of amino groups and monoalkylamino groups of from 1 to 50.

6. The method of producing a polyamine compound according to claim 1, wherein:
    generating the polyamine compound comprises:
        reacting the polyurea compound and the amine compound B with each other to obtain a reaction mixture comprising a polyamine compound; and
        separating the polyamine compound from the reaction mixture, and
    the separating comprises separating the polyamine compound from the reaction mixture by a distillation method.

7. The method of producing a polyamine compound according to claim 1, wherein:
generating the polyamine compound comprises:
reacting the polyurea compound and the amine compound B with each other to obtain a reaction mixture comprising a polyamine compound; and
separating the polyamine compound from the reaction mixture, and
the separating comprises:
extracting the polyamine compound from the reaction mixture using an extraction solvent to obtain an extract comprising the polyamine compound; and
separating the polyamine compound from the extract.

8. The method of producing a polyamine compound according to claim 1, which is a method of producing a polyamine compound as a raw material of a polyisocyanate compound for production of an optical material.

9. The method of producing a polyamine compound according to claim 1, wherein the thiourethane resin is collected in at least one of an eyeglass lens production process, an eyeglass production process, or an eyeglass disposal process.

10. A method of producing a polyisocyanate compound, the method comprising:
producing a polyamine compound by the method of producing a polyamine compound according to claim 1; and
obtaining a polyisocyanate compound by reacting at least one of the polyamine compound or a hydrochloride of the polyamine compound and carbonyl dichloride with each other.

11. A method of producing a polymerizable composition, the method comprising:
producing a polyisocyanate compound by the method of producing a polyisocyanate compound according to claim 10; and
obtaining a polymerizable composition comprising the polyisocyanate compound and an active hydrogen compound by mixing at least the polyisocyanate compound and the active hydrogen compound.

12. A method of producing a resin, the method comprising:
producing a polymerizable composition by the method of producing a polymerizable composition according to claim 11; and
obtaining a resin by curing the polymerizable composition.

13. A method of producing a resin-containing formed body, the method comprising:
producing a polymerizable composition by the method of producing a polymerizable composition according to claim 11; and
obtaining a resin-containing formed body by curing the polymerizable composition.

14. A method of producing an optical material comprising a resin-containing formed body, the method comprising:
producing a polymerizable composition by the method of producing a polymerizable composition according to claim 11; and
obtaining a resin-containing formed body by curing the polymerizable composition.

15. A method of producing a lens comprising a resin-containing formed body, the method comprising:
producing a polymerizable composition by the method of producing a polymerizable composition according to claim 11; and
obtaining a resin-containing formed body by curing the polymerizable composition.

* * * * *